US008966456B2

(12) United States Patent
Foti

(10) Patent No.: US 8,966,456 B2
(45) Date of Patent: *Feb. 24, 2015

(54) SYSTEM AND METHOD FOR PROVIDING AND USING META-DATA IN A DYNAMICALLY TYPED ARRAY-BASED LANGUAGE

(75) Inventor: David A. Foti, Tolland, CT (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/488,428

(22) Filed: Jul. 17, 2006

(65) Prior Publication Data

US 2007/0288892 A1    Dec. 13, 2007

(51) Int. Cl.
*G06F 9/45* (2006.01)
*G06F 17/30* (2006.01)
*G06F 9/44* (2006.01)

(52) U.S. Cl.
CPC ..................... *G06F 8/315* (2013.01)
USPC .......................... 717/136; 707/736; 707/602

(58) Field of Classification Search
CPC .................................................. G06F 9/4428
USPC .................................................. 707/103, 102
See application file for complete search history.

(56) References Cited

U.S. PATENT DOCUMENTS

| | | | | |
|---|---|---|---|---|
| 5,280,610 A * | 1/1994 | Travis et al. | ............ | 1/1 |
| 5,361,350 A * | 11/1994 | Conner et al. | ............ | 1/1 |
| 5,437,027 A * | 7/1995 | Bannon et al. | ............ | 1/1 |
| 5,692,129 A * | 11/1997 | Sonderegger et al. | ............ | 1/1 |
| 5,752,028 A * | 5/1998 | Ellacott | ............ | 1/1 |
| 5,842,220 A * | 11/1998 | De Groot et al. | ............ | 1/1 |
| 5,864,862 A * | 1/1999 | Kriens et al. | ............ | 1/1 |
| 5,920,725 A | 7/1999 | Ma et al. | | |
| 5,960,438 A * | 9/1999 | Chang et al. | ............ | 707/792 |
| 6,061,689 A * | 5/2000 | Chang et al. | ............ | 717/116 |
| 6,085,198 A * | 7/2000 | Skinner et al. | ............ | 1/1 |
| 6,226,649 B1 | 5/2001 | Bodamer et al. | | |
| 6,237,003 B1 * | 5/2001 | Lewish et al. | ............ | 1/1 |
| 6,263,492 B1 | 7/2001 | Fraley et al. | | |
| 6,574,631 B1 | 6/2003 | Subramanian et al. | | |
| 6,775,680 B2 * | 8/2004 | Ehrman et al. | ............ | 1/1 |

(Continued)

FOREIGN PATENT DOCUMENTS

EP    1400897 A2    3/2004
EP    1569132 A1    8/2005

OTHER PUBLICATIONS

Suzanne M. Embury; Using Prolong to Provide Access to Metadata in an Object-Oriented Database; 1992; ResearchGate; pp. 1-22.*

(Continued)

*Primary Examiner* — Shew-Fen Lin
*Assistant Examiner* — Jermaine Mincey
(74) *Attorney, Agent, or Firm* — Harrity & Harrity, LLP

(57) ABSTRACT

A class definition syntax that leverages the array and math-oriented nature of a dynamically typed array-based programming language is discussed. Some embodiments of the present invention provides a mechanism for using meta-data to define a class implemented in the dynamically typed array-based programming language. The meta-data provide an easy way to provide class definitions and allow a user to access the class definitions from objects. The meta-data also support extension of class definitions without introducing backward incompatibility.

26 Claims, 15 Drawing Sheets

(56) References Cited

U.S. PATENT DOCUMENTS

| | | | |
|---|---|---|---|
| 6,836,870 B2* | 12/2004 | Abrams | 715/730 |
| 6,839,725 B2* | 1/2005 | Agesen et al. | 1/1 |
| 6,901,588 B1* | 5/2005 | Krapf et al. | 717/164 |
| 7,805,466 B2 | 9/2010 | Aspinall | |
| 7,984,416 B2 | 7/2011 | Foti | |
| 8,060,864 B1* | 11/2011 | Michelsen | 717/126 |
| 2002/0069400 A1 | 6/2002 | Miloushev et al. | |
| 2003/0014588 A1* | 1/2003 | Hu et al. | 711/118 |
| 2003/0016220 A1 | 1/2003 | Cohen | |
| 2003/0066057 A1 | 4/2003 | RuDusky | |
| 2003/0204517 A1 | 10/2003 | Skinner et al. | |
| 2004/0015579 A1 | 1/2004 | Cooper et al. | |
| 2005/0108206 A1 | 5/2005 | Lam et al. | |
| 2005/0134707 A1* | 6/2005 | Perotti et al. | 348/239 |
| 2005/0138609 A1* | 6/2005 | Mitchell | 717/136 |
| 2005/0165807 A1* | 7/2005 | Srinivasan et al. | 707/100 |
| 2005/0187908 A1* | 8/2005 | Madan et al. | 707/3 |
| 2005/0203950 A1* | 9/2005 | Rajan et al. | 707/103 R |
| 2005/0216885 A1* | 9/2005 | Ireland | 717/108 |
| 2005/0246677 A1* | 11/2005 | Mountain et al. | 717/100 |
| 2005/0262493 A1* | 11/2005 | Schmidt et al. | 717/164 |
| 2006/0004845 A1* | 1/2006 | Kristiansen et al. | 707/103 R |
| 2006/0004856 A1* | 1/2006 | Shen et al. | 707/103 Y |
| 2006/0136439 A1* | 6/2006 | Fuller et al. | 707/100 |
| 2006/0195460 A1 | 8/2006 | Nori et al. | |
| 2006/0200486 A1* | 9/2006 | Castro et al. | 707/102 |
| 2006/0248038 A1* | 11/2006 | Kaplan et al. | 707/1 |
| 2007/0011192 A1 | 1/2007 | Barton | |
| 2007/0088724 A1 | 4/2007 | Demiroski et al. | |
| 2007/0124334 A1 | 5/2007 | Pepin | |
| 2009/0047971 A1 | 2/2009 | Fu | |
| 2009/0245197 A1 | 10/2009 | Ma et al. | |
| 2011/0136496 A1 | 6/2011 | Klang et al. | |

OTHER PUBLICATIONS

Bouraqadi-Saâdani, Noury M.N. et al., "Safe Metaclass Programming," *ACM Sigplan Notices, Association for Computing Machinery*, vol. 33(10):84-96 (1998).

Liberty, Jesse, "Programming C#," O'Reilly®, Valerie Quercia Ed. (2001).

Invitation to Pay Additional Fees for Application No. PCT/US2007/016169, dated Jan. 28, 2008.

Van Roy, Peter et al., "Concepts, Techniques, and Models of Computer Programming," The MIT Press, Cambridge, pp. 518-537 (2004).

International Search Report for Application No. PCT/US2007/007375, dated Feb. 7, 2008.

Buneman, Peter et al., "A Type System that Reconciles Classes and Extents," *Proceedings of the 3rd International Workshop on Database Programming Languages*, pp. 191-202 (1991).

Capponi, Cécile, "Design and Implementation of a Type System for a Knowledge Representation System," retrieved online at: ftp://ftp.inria.fr/INRIA/publication/publi-pdf/RR/R-3096.pdf (1997).

Dagan, Ido et al., "A Set Expression Based Inheritance System," *Annals of Mathematics and Artificial Intelligence*, vol. 4:269-280 (1991).

Girardot, Jean Jacques et al., "An Object Oriented Extension to APL," retrieved online at: http://www.fscript.org/documentation/OOPAL.pdf (1987).

Mougin, Philippe et al., "OOPAL: Integrating Array Programming in Object-Oriented Programming," *Proceedings of the 18th ACM Sigplan Conference on Object-Oriented Programming, systems, Languages and Applications*, retrieved online at: http://www.fscript.org/documentation/OOPAL.pdf (2003).

Invitation to Pay Additional Fees for Application No. PCT/US2007/007375, dated Oct. 26, 2007.

International Search Report for Application No. PCT/US2007/016169, dated May 23, 2008.

European Office Action for Application No. 07810519.4, dated Apr. 23, 2009.

Stroustrup, Bjarne, "The C++ Programming Language, Special Edition," Chpt. 12 (2000).

Willink, Edward D. et al., "Preprocessing C++: Meta-Class Aspects," Proceedings of the Eastern European Conference on the Technology of Object Oriented Languages and Systems, TOOLS EE '99, pp. 1-12 (1999).

European Office Action for Application No. 07810519.4, dated Jul. 5, 2010.

Co-pending U.S. Appl. No. 11/890,646 entitled "System and Method for Providing and Using Meta-Data in a Dynamically Typed Array-Based Language", by Foti, filed Aug. 6, 2007, 54 pages.

Miller et al., "The Common Language Infrastructure Annotated Standard", Addison-Wesley, Oct. 2003, 891 pages.

* cited by examiner

SYSTEM AND METHOD FOR PROVIDING AND USING META-DATA IN A DYNAMICALLY TYPED ARRAY-BASED LANGUAGE

FIELD OF THE INVENTION

The illustrative embodiment of the present invention relates generally to meta-data for an array-based language, and more particularly to a mechanism for providing class definitions using meta-data.

BACKGROUND OF THE INVENTION

Many programming languages including graphical programming languages, textual programming languages and dynamically typed array-based languages, such as MATLAB® from The MathWorks, Inc. of Natick, Mass., provide support for classes and object-oriented programming. Array-based languages, such as programming language used in Microsoft Excel or the MATLAB® programming environment, are a natural choice to solve many different mathematical and scientific computing problems. Object-oriented programming languages support the concept of inheritance which allows new classes to be derived from existing classes. Providing object-oriented support in a dynamically typed array-based language supplies programmers with powerful tools for solving technical problems.

In existing programming languages, such as the JAVA programming language, meta-data is used to describe a class created within the JAVA programming language. In JAVA and in other existing languages, language syntax exists to create and manipulate instances of classes, known as objects. The JAVA language processor can only have programs create and manipulate instances of classes defined in the JAVA language. The Microsoft.NET Common Language Runtime (CLR) language processor can define meta-data that is used to describe classes defined in many different programming languages. However, code in each language must be compiled by a specialized compiler that produces CLR meta-data and the generated code by the specialized compiler has to create and manipulate objects according to very specific CLR requirements. Hence, a JAVA program cannot directly create and manipulate a CLR-defined class and vice-versa. In the aforementioned language processors, meta-data classes are primarily used to describe a class to code that needs information about the class at runtime. For example, a graphical user interface design tool may be able to examine meta-data for many graphical component classes and allow a user to choose specific controls to place in a dialog box. The aforementioned language processors require that objects conform to a common memory management and memory layout model. Meta-data are not used to describe how a class stores data because all classes must use essentially the same system for storing data. This means that it is not possible for objects belonging to different classes to use different systems and mechanisms for storing data. If a class needs to store data in a different way, then it must provide a special programming interface to access that data instead of simply using a field or property in the class. Moreover, the aforementioned JAVA programming language and CLR, like many other existing programming languages, do not provide a mechanism for extending the meta-data classes and specifying that a particular class uses meta-data classes different from the default meta-data classes. For example, all JAVA classes are represented by the JAVA meta-data class called java.lang.Class. There is no way to extend this class, add additional data or customized properties, and then specify that a particular JAVA class should use this extended meta-data class. Furthermore, existing languages do not define a direct correspondence between class definition syntax and meta-data that would enable a class definition to specify values for attributes defined in the extended meta-data classes.

SUMMARY OF THE INVENTION

Some of the illustrative embodiments of the present invention provide a class definition syntax that leverages the array and math-oriented nature of a dynamically typed array-based programming language. The present invention provides a mechanism for using meta-data to describe a class implemented in the dynamically typed array-based programming language. The class definition syntax and meta-data also support extension of class definitions without introducing backward incompatibility.

In one embodiment of the present invention, a method of defining classes in a computing environment supporting a dynamically typed array-based programming language is provided. The method includes obtaining first meta-data for providing a class definition using the dynamically typed array-based programming language; and defining a class using the first meta-data. In one aspect of the present invention, the first meta-data may be a user-defined subclass of second meta-data. The first meta-data may describe an attribute for a class, a method, a property, or an event. Moreover, the first meta-data may be a meta-class. In another aspect of the present invention, the class definition includes one or more attributes, each of the one or more attributes has a name and corresponds to a property with the same name in the first meta-class.

In another embodiment of the present invention, a method of accessing data of an object is provided. The method includes obtaining an object that is instantiated from a class, the class is associated with a plurality of meta-data, and accessing a data value of the object via one of the plurality of meta-data. In one aspect of the present invention, the class is defined in a dynamically typed array-based programming environment.

In yet another embodiment of the present invention, a method of processing a class created by a programming language is provided. The method includes obtaining a plurality of meta-data associated with the class; and creating a compiled version of the class, wherein the compiled version is embedded with the plurality of meta-data. In one aspect of the present invention, the programming language is a dynamically typed array-based programming language. In another embodiment of the present invention, the method further includes creating an instance of the class; and accessing a data value of the instance via at least one of the plurality of meta-data.

In still another embodiment of the present invention, a system for defining classes is provided. The system includes a programming language that is used to implement a class, wherein the class is implemented using one or more attributes, wherein each attribute corresponds to a property of a meta-class that is associated with the class. In one aspect of the present invention, the programming language is a dynamically typed array-based programming language. In a further aspect of the present invention, the system further includes a language processor that processes the programming language, wherein the language processor allows the class to be defined using meta-data.

In yet another embodiment of the present invention, a medium holding computer-executable instructions for defining classes in a computing environment supporting a programming language is provided, where the instructions include instructions for obtaining first meta-data for providing a class definition using the dynamically typed array-based programming language; and defining a class using the first meta-data.

In still another embodiment of the present invention, a medium holding computer-executable instructions for accessing an object is provided, where the instructions include instructions for obtaining an object that is instantiated from a class, the class is associated with a plurality of meta-data; and accessing a data value of the object via one of the plurality of meta-data.

In yet another embodiment of the present invention, a medium holding computer-executable instructions for processing a class created by a programming language is provided, where the instructions include instructions for obtaining a plurality of meta-data associated with the class; and creating a compiled version of the class, wherein the compiled version is embedded with the plurality of meta-data.

In a further aspect of the present invention, a method of defining classes in a distributed computing environment supporting a dynamically typed array-based language is provided. The method includes providing a language processor for a dynamically typed array-based language on a second computing device, the language processor supporting the use of at least one meta-data during class definitions; establishing a communication channel between a first computing device and the second computing device over a network; entering commands to define a class from the first computing device using said at least one meta-data supported by the language processor; and transmitting the commands over the communication channel to the second computing device.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Some embodiments of the present invention provide a method and system for providing meta-data to define a class implemented in a dynamically typed array-based programming language. A compiled class includes embedded meta-data that is used to access objects instantiated from the class. The use of extensible meta-data and extensible syntax for specifying class definition attributes can support extension of class definitions without introducing backward incompatibility.

For the purposes of illustration, a number of the examples contained herein are discussed with reference to MATLAB®, a dynamically typed array-based programming language from The MathWorks, Inc. of Natick, Mass. It should be appreciated that MATLAB® has been chosen as a singular example of a dynamically-typed array-based programming language and the invention should not be interpreted as being restricted solely to MATLAB®. Likewise, references made herein to MATLAB® should be understood to also include other dynamically typed array-based languages. It should also be appreciated that the use of set notation in the present invention as discussed herein is applicable to other textual and graphical programming languages such as the Unified Modeling Language (UML) and the System Modeling Language (SysML) in addition to being applicable to dynamically typed array-based programming languages.

Figure 1:
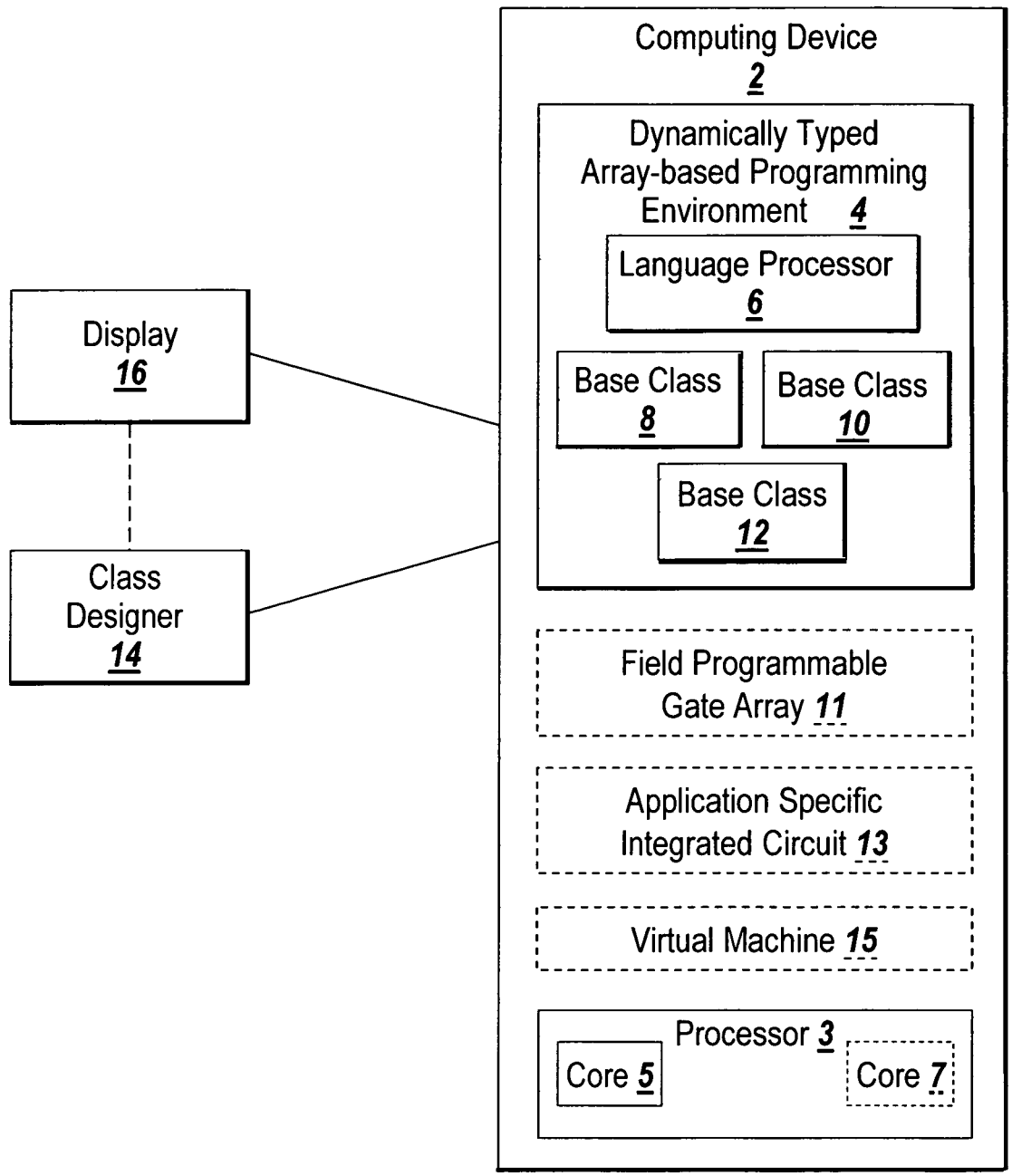
FIG. 1 depicts an environment suitable for practicing the illustrative embodiment of the present invention.

FIG. 1 depicts an environment suitable for practicing the illustrative embodiment of the present invention. A computing device 2 hosts a dynamically typed array-based programming environment 4. An exemplary computing device 2 with a dynamically typed array-based programming environment 4 is a computer executing MATLAB® (It will be noted that MATLAB® is referred to herein as both a high level dynamically typed array-based language and as an interactive environment. The meaning of each particular reference to MATLAB® is apparent from the context of the discussion in which it takes place). The computing device 2 may be a PC, workstation, server, laptop, mainframe, PDA or other computing device equipped with a processor and capable of hosting the dynamically typed array-based programming environment 4. The computing device 2 may be a virtualized device. The computing device 2 may be equipped with a single processor, a multi-core processor, or multiple processors. By way of example, FIG. 1 shows processor 3 with core 5 and optionally core 7. Each processor may be a 32 bit processor, 64 bit processor or some other type of processor capable of executing the instructions required for the present invention, such as, for example, a graphics processing unit (GPU) or application specific hardware that is either programmable (Field Programmable Gate Array 11), tailored to an application domain (Application Specific Instruction set Processor), or custom designed to fit an application (Application Specific Integrated Circuit 13). Virtualized processors may also be used with dynamically typed array-base programming environment 4 and other software installed on computing device 2. A virtual machine 15 can be provided to handle a process running on multiple processors so that the process appears to be using only one computing resource rather than multiple. Multiple virtual machines can also be used with one processor. Other computing resources, such as FPGA, ASIC, ASIP, DSP, and GPP, may also be used for executing code and/or software. A hardware accelerator, such as implemented in an ASIC, FPGA, or the like, can additionally be used to speed up the general processing rate of the computing device 2.

The dynamically typed array-based programming environment 4 includes a language processor 6 capable of processing program code written in a dynamically typed array-based language. Language processor 6 can be, but is not limited to, a compiler, an interpreter, a virtual machine, or other types of execution engine, or a combination of some or all of the above. The language processor 6 supports the use of an element-wise attribute for methods defined in a class that specifies operations to be carried out on all elements in an array and set notation in class definitions that facilitates class inheritance. The element-wise attribute and set notation are discussed in further detail below. The dynamically typed array-based programming environment 4 may also include previously defined base classes 8, 10 and 12 which may be referenced by a class designer 14 using the set notation of the present invention to derive new classes. The class designer 14 may interact with the dynamically typed array-based programming environment 4 via a display 16 that is in communication with the computing device 2.

Figure 2:
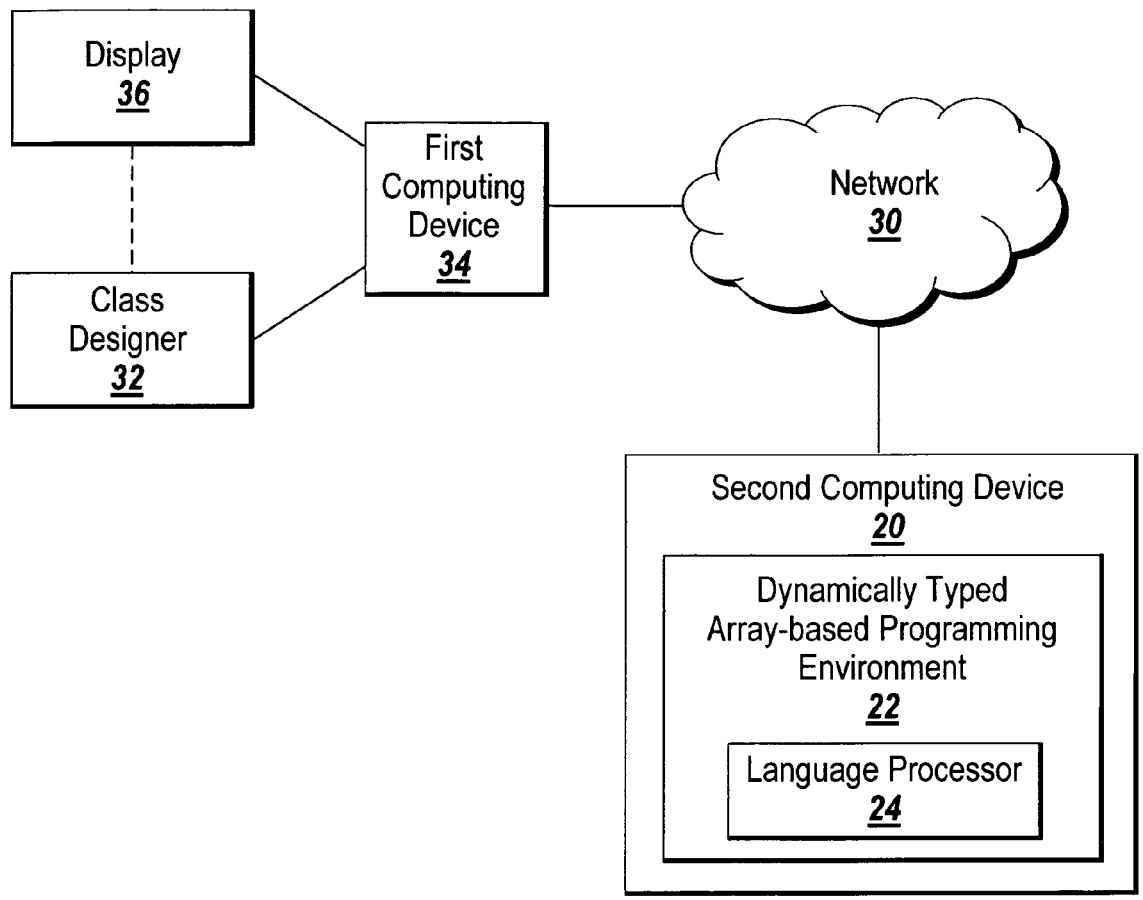
FIG. 2 depicts an alternate distributed environment suitable for practicing the illustrative embodiment of the present invention.

Those skilled in the art will recognize that the illustrative embodiment of the present invention may be implemented using other architectures than that shown in FIG. 1. For example, one such alternate implementation of the illustrative embodiment may be implemented in a distributed architecture such as that shown in FIG. 2. A class designer 32 accesses a first computing device 34 and an associated display device 36. The first computing device 34 communicates over a network 30 with a second computing device 20. The second computing device 20 hosts a dynamically typed array-based programming environment 22. The dynamically typed array-based programming environment 22 includes a language processor 24. The class designer 32 enters commands on the first computing device 34 that are transmitted to the second computing device 20 for execution. The results of the execution of the class designer's commands are then transmitted over the network 30 to the first computing device 34 where they are displayed for the user on the display device 36. The second computing device 20 and other components in the distributed architecture may be virtual components. The network 30 may be the Internet, a local area network (LAN), a wide area network (WAN), a wireless network, an intranet, an extranet or some other type of network. It will be appreciated by those skilled in the art that other distributed and parallel architectures enabling the execution of the invention described herein are also within the scope of the invention.

Class designers frequently wish to define one class in terms of another because it is simpler to define a new class in terms of an existing class and simpler to learn how to use such a new class if there is already familiarity with the existing class. The illustrative embodiment of the present invention allows a class designer to use set notation to create a new class where the new class is referred to as a subclass of the first class and the first class is referred to as a superclass. The use of mathematical set notation allows the class designer to recognize that the subclass defines a set of class instances that represent a subset of the superset of class instances defined by the superclass.

Set Notation

Set notation may be used to create a new subclass from a single class or to indicate that a derived class multiply inherits from two or more base classes. In conventional systems supporting multiple inheritance such as C++ (See for example, Bjarne Stroustrup's "The C++ Programming Language, $3^{rd}$ Edition"), a class A may inherit from a class B multiple times. This conventional model of inheritance is not based on sets because a member of the set defined by class B cannot be a member of the set defined by class A multiple times. The C++ model leads to confusion about how to refer to the properties and methods of each separate instance of class A that is embedded in class B. In contrast, the illustrative embodiment of the present invention provides an inheritance model based on sets that defines multiple inheritance such that if a class C inherits from classes A and B, then C defines a subset of the union of A and B. The use of set notation provides that if class B is defined as subclass of A and A, this is equivalent to defining a subset of the set union of A and A which is A. There is no confusion created by a subclass having multiple copies of a base class because a subclass cannot have multiple copies of a base class.

While a class defines a set of objects (or potential objects) with certain common features such as method and property names, a subclass defines a subset of objects sharing some additional features, such as additional property names. The subclass is often a more specialized form of the superclass. For example, consider a Rectangle class that is specified in terms of width and height dimensions. For a particular application, it may be more convenient to specify rectangles using opposite corners rather than one corner and width/height dimensions. With the use of the subclass, a class designer does not have to redefine the entire class (including the methods that don't deal with corners). Instead, the class designer may create a subclass of the Rectangle class that supports four corners as follows:

```
classdef CornerRectangle < Rectangle
    properties(Computed = true)
        X2, Y2
    end
    methods
        function X2 = get.X2(r)
            X2 = r.X + r.Width;
        end
        function set.X2(r, X2)
            r.Width = X2 − r.X;
        end
        function Y2 = get.Y2(r)
            Y2 = r.Y + r.Height;
        end
        function set.Y2(r, Y2)
            r.Height = Y2 − r.Y;
        end
    end
end
```

The '<' sign is used in the example above to suggest subset. By defining CornerRectangle as a subclass of Rectangle, there is no need to repeat any of the properties or methods already defined by Rectangle since CornerRectangle inherits these properties and methods from Rectangle. One advantage of subclassing is that it provides many possible ways to avoid code duplication by reusing existing code. For example, common code from the two classes may be put into a method on the base class and called by methods of the derived class. The existence of a sub-classing relationship also makes it easier to document and use the Rectangle and CornerRectangle classes. A user familiar with the Rectangle class will be able to use instances of cornerRectangle without learning anything new.

The illustrative embodiment of the present invention also allows for mathematical set notation to be used to specify that a derived class multiply inherits from two or more base classes. Just as one can take the union and intersection of sets, one can talk about the union and intersection of classes. A class definition can use an equivalence relationship to give a name to a union or intersection of other classes. For example, suppose a number of functions require their inputs to be either single or double. Rather than having expressions like:

if class(x)<(single|double)

A class named float may be defined as the union of single and double:

classdef float=single|double,end where the symbol '|' represents a union operation and the expression may then read:

if(class(x)<float)

Intersection classes may be defined in the same way. Intersection classes can be used to require that an object have a certain set of traits where each trait is defined by a class. For example, suppose that a GUI library exists in which there are the following general abstract widget classes:

Button
    Switch
    Slider
    Dial

Now suppose that there are also classes that describe what kind of states are possible in Widgets. These classes are:

BooleanState
    IntegerState
    FractionState
    FloatState

Actual concrete widgets may then be derived from combinations (intersections) of one class from each of the above groups. Thus:

classdef ToggleButton < Button & BooleanState
    classdef LightButton < Button & BooleanState
    classdef RoundFractionDial < Dial & FractionState
    cassdef ColorSlider < Slider & IntegerState The symbol '&' is used to denote set intersection in the example above. Those skilled in the art will recognize that the actual indicator used to indicate the set notation operation (e.g. union "|", intersection "&", etc.) is an implementation choice. Similarly, although the examples above have used the mathematical less than sign ("<") in order to indicate a class is a subclass of one or more classes, it will be appreciated that other indicators may be substituted without departing from the scope of the present invention.

It will be appreciated that the examples mentioned above are illustrations of a small portion of the type of set operations that may be triggered through the use of set notation by the illustrative embodiment of the present invention. For example, a sub-class may be defined using set notation so that it inherits properties from a set made of multiple other sets. Likewise, a class being defined using the set notation of the present invention may be a subclass that inherits only interface methods of a class without inheriting the implementation of the methods. Similarly the properties that are inherited by the subclass may be limited by constraints referenced by the set notation.

Figure 3:
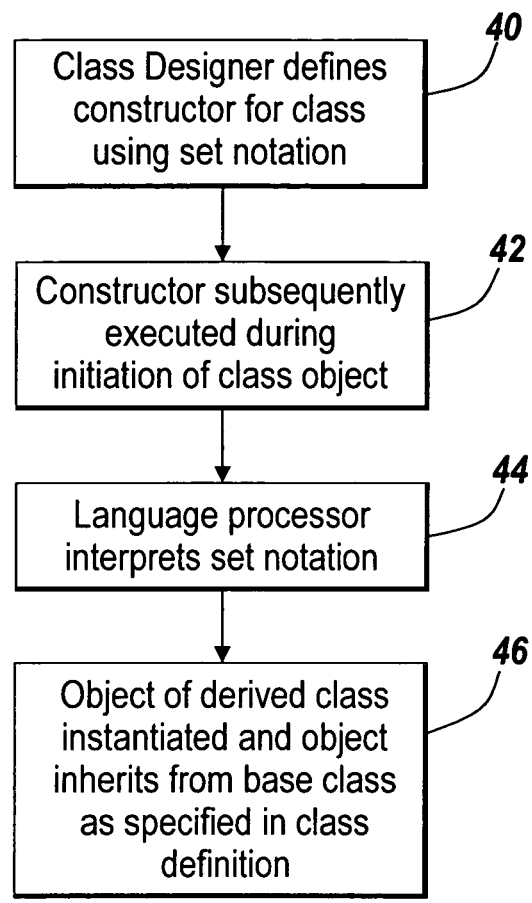
FIG. 3 is a flowchart of a sequence of steps followed by the illustrative embodiment of the present invention to derive classes using set notation.

FIG. 3 is a flowchart of a sequence of steps followed by the illustrative embodiment of the present invention to derive classes using set notation. The sequence begins when the class designer defines the subclass using set notation (step 40). The set notation may indicate that the class is derived from an intersection or union of two base classes. Subsequently, the class definition is accessed during the instantiation of a class object (step 42) and the language processor interprets the set notation (step 44). An object of the derived class is then instantiated with the object inheriting from the base classes as specified in the class definition.

The illustrative embodiment of the present invention may also be extended to other textual and graphical programming languages in addition to dynamically typed array-based programming languages. Other textual or graphical programming languages include UML, SysML, Modelica, Dymola, VHDL and VHDL-AMS as well as SIMULINK® from The MathWorks, Inc. of Natick, Mass. FIGS. 4A-4D illustrate an example of the use of the set notation of the present invention in a graphical programming language.

The blocks in a graphical modeling library may be thought of as a class, instances of which are instantiated when placed in a graphical model. A graphical modeling library may include a template block for a configurable subsystem template. The configurable subsystem template block may link to other blocks in the graphical modeling library. Upon selection of linked blocks, the linked blocks will be used in place of the template block in the graphical model. The definition of the configurable subsystem template block in the library may include set notation indicating which blocks the configurable subsystem can be linked to by means of reference to other subsystem templates.

Figure 4A:
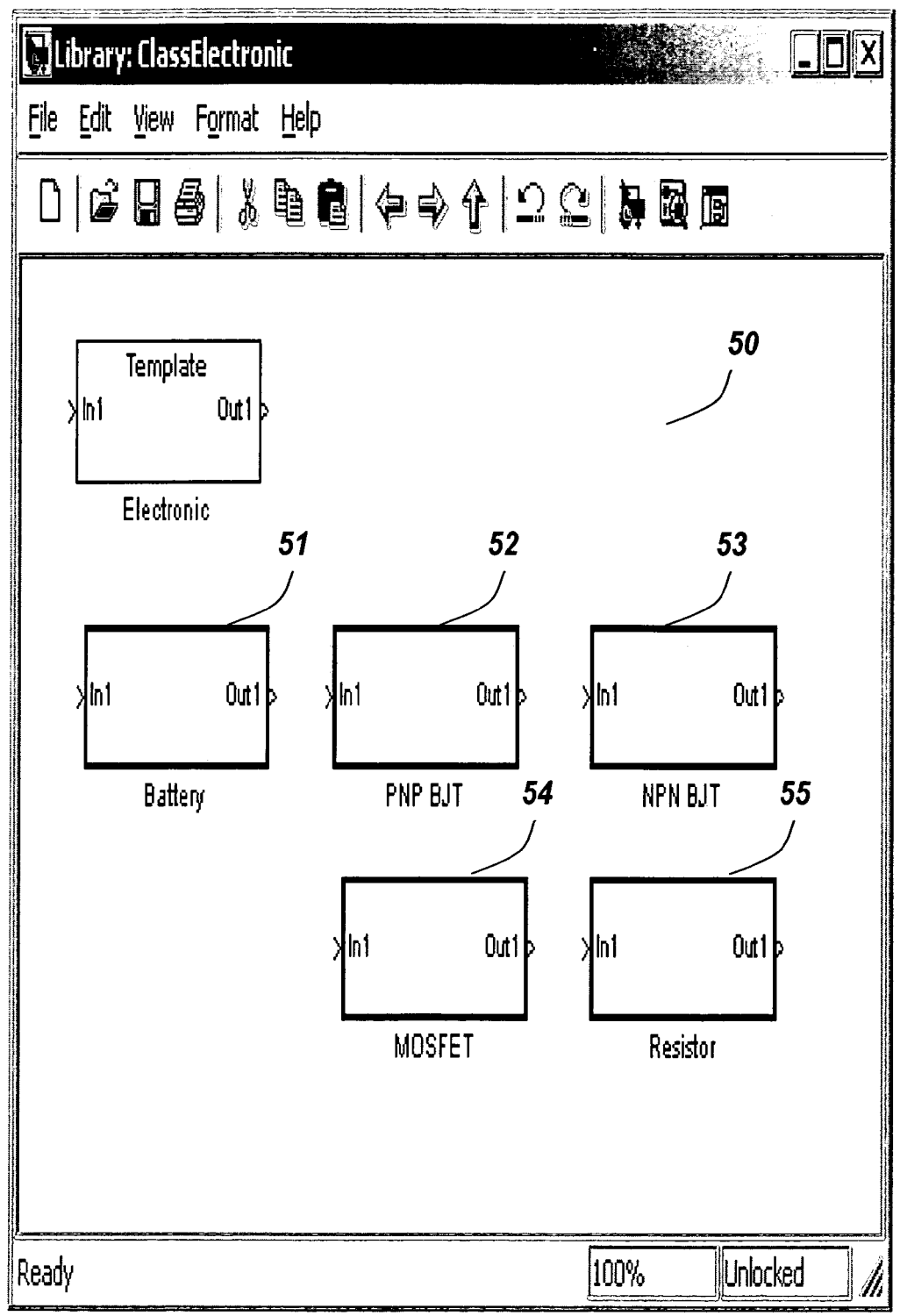
FIG. 4A depicts a model class electronic.
Figure 4B:
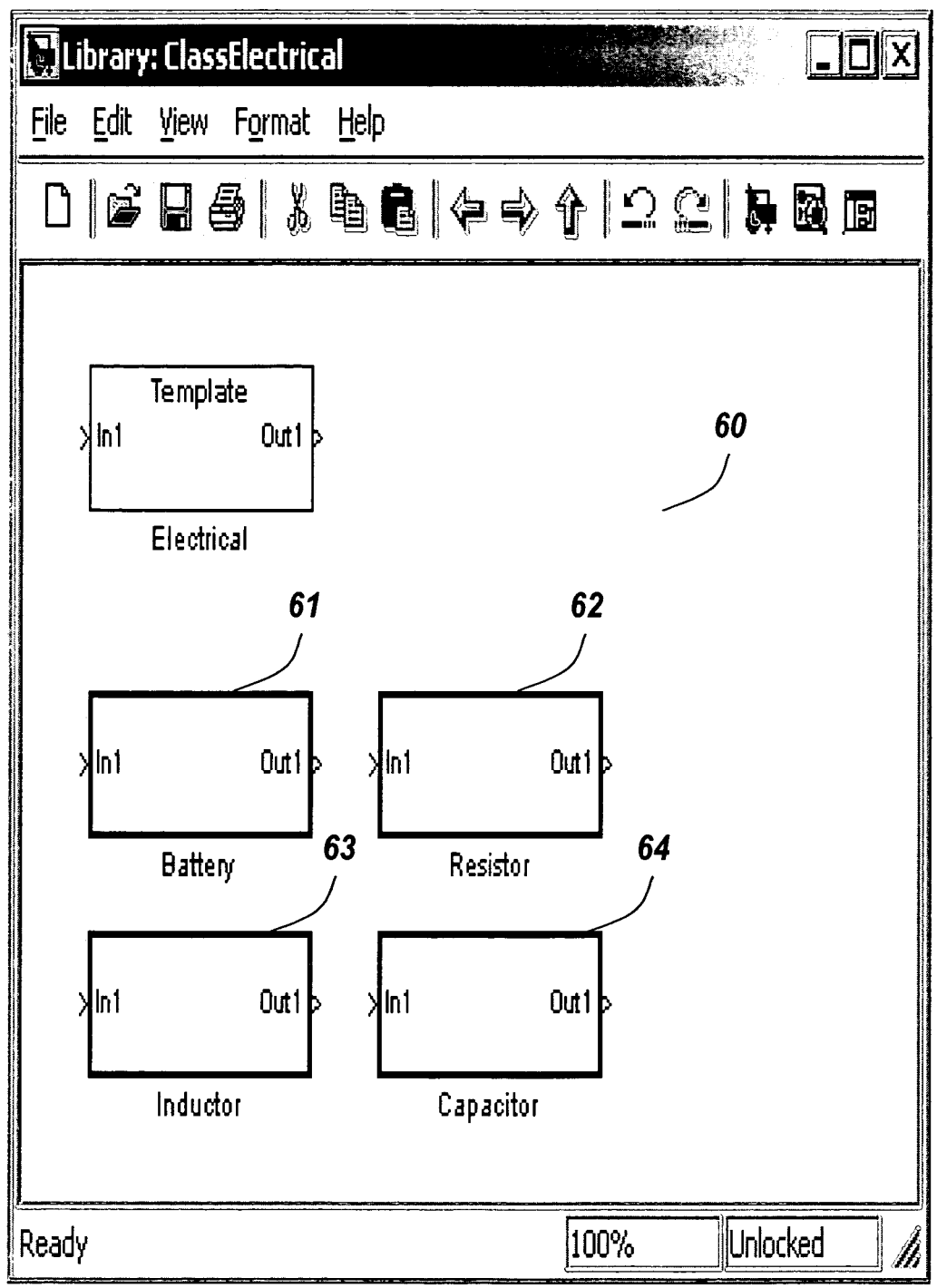
FIG. 4B depicts a model class electrical.
Figure 4C:
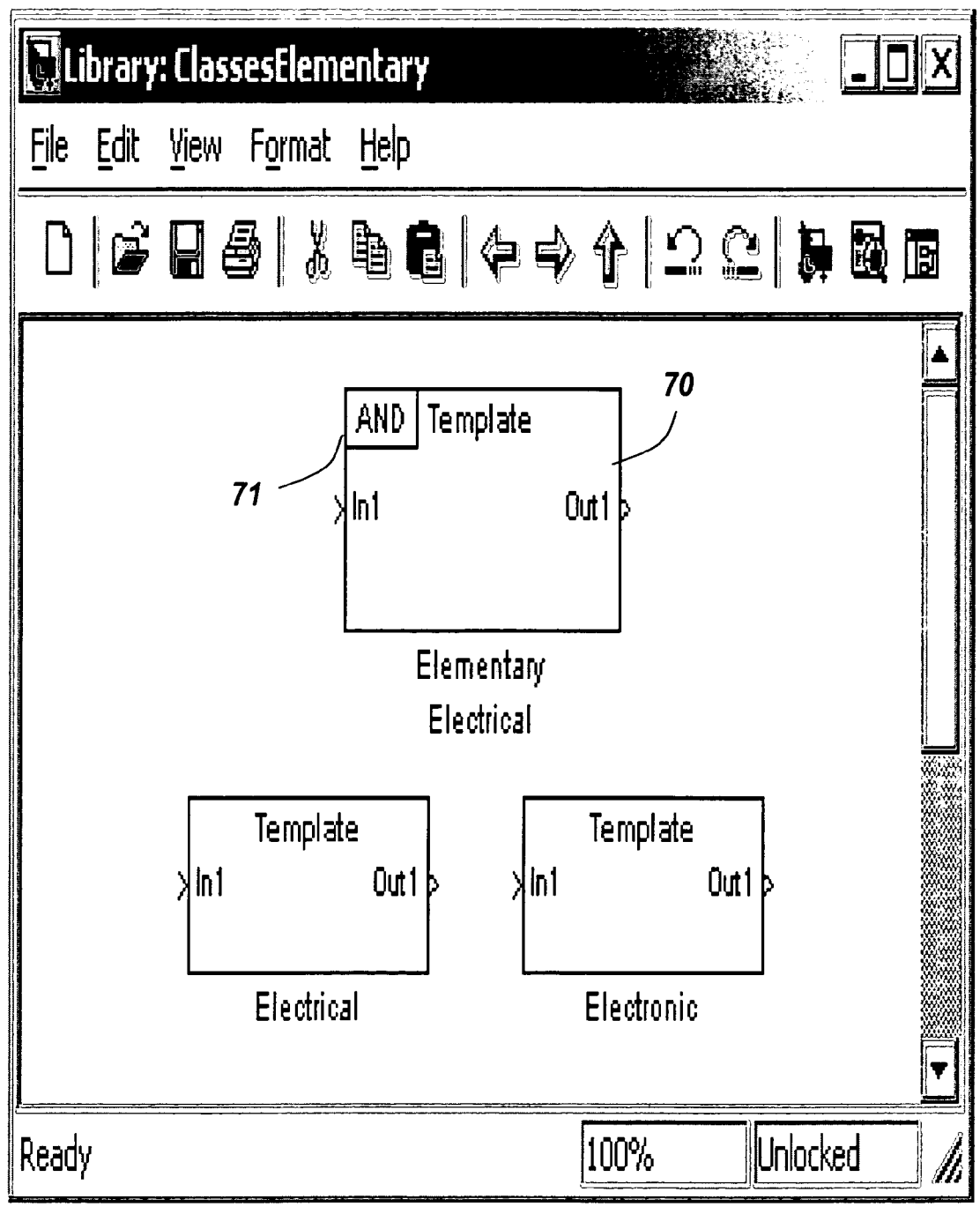
FIG. 4C depicts a configurable subsystem template block in a model library that uses set notation to reference the intersection of the classes depicted in FIGS. 4A and 4B.
Figure 4D:
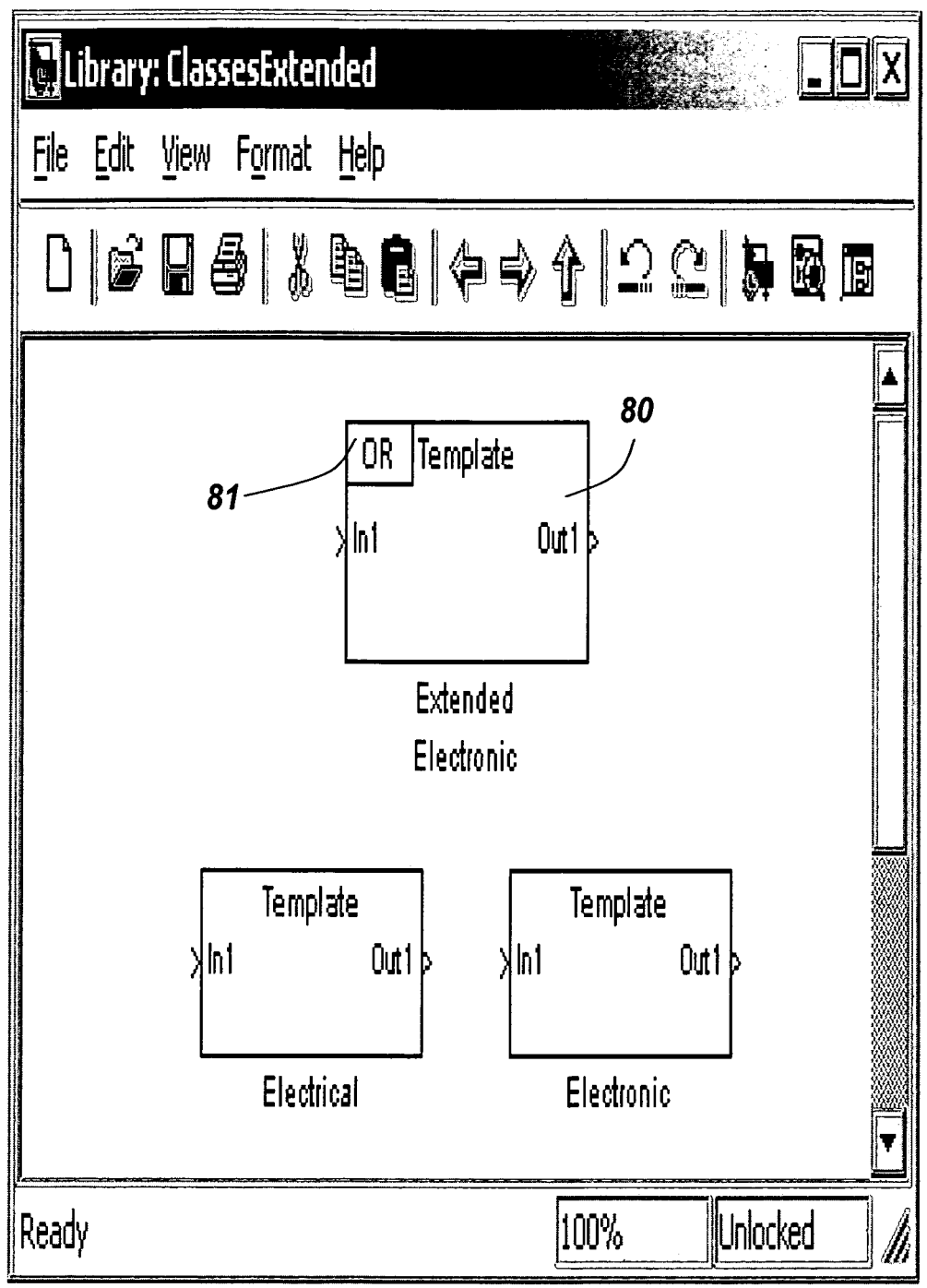
FIG. 4D depicts a configurable subsystem template block in a model library that uses set notation to reference the union of the classes depicted in FIGS. 4A and 4B.

By way of example of the use of set notation for class definition in a graphical modeling language, FIG. 4A depicts a class electronic 50 in the model library ClassElectronic that includes a battery block 51, a PNP BJT block 52, an NPN BJT block 53, a MOSFET block 54 and a Resistor Block 55. FIG. 4B depicts a class electrical 60 that includes a battery block 61, a resistor block 62, an inductor block 63 and a capacitor block 64. The elements in the class electronic 50 and class electrical 60 may be instantiated from another class or directly imported. For example, the Resistor Block may be an element defined elsewhere that is referenced by the class electronic 50 and class electrical 60. When the intersection of the two classes is determined, the resistor is identified to be one and the same element because the blocks in the different sets reference the same underlying element. Alternately, a pure syntactic check can be done by considering an element to be the same if it has the same name in the two sets that are being intersected. Other methods may also be applied to identify identical elements such as checking whether the interface and/or properties are identical. FIG. 4C depicts a configurable subsystem template block 70 that uses set notation ("and") 71 to reference the two classes depicted in FIGS. 4A and 4B. As a result of the use of the set notation, the instantiated configurable subsystem block will include the blocks from the intersection of the two classes depicted in FIGS. 4A and 4B, battery and resistor, since the "and" indicates the blocks must be in the first class and the second class. Similarly, FIG. 4D depicts a configurable subsystem template block 80 which uses set notation ("or") 81 to reference the two classes depicted in FIGS. 4A and 4B. As a result of the use of the set notation, the instantiated configurable subsystem block will include the blocks from the union of the two classes depicted in FIGS. 4A and 4B, all the blocks in both classes, since the "or" indicates the blocks must be in either the first class or the second class.

Element-Wise Operations

The illustrative embodiment of the present invention also provides a syntax that leverages the array-based capabilities of the dynamically typed array-based language. In general in MATLAB® and other array-based languages, all values may be arrays and support array indexing. User-defined classes are also arrays unless array operations are explicitly overridden to prohibit array formation and indexing. Thus, class methods must expect that input arguments may be object arrays. There are many methods where invocation on an array is the same as looping over each element and performing the operation on each element (referred to as an "element-wise" operation). Element-wise operations include element-wise binary operations such as plus and minus where the result of the operation is an array having the same dimensions as the array input parameters and where each element in the output array is the result of a scalar operation performed on corresponding elements of the input arrays. In general, element-wise methods perform an operation on one or more input parameters to produce one or more output parameters where each output parameter is a concatenation of results produced by applying the method to corresponding elements of each input parameter. Input parameters may be scalar in which case all such scalar values are passed to the method with each element of the non-scalar parameters.

The illustrative embodiment of the present invention provides an element-wise attribute which may be utilized by the class designer to automate the process of implementing element-wise methods in the class. During the creation of a method for the class, the class designer assigns the new method the element-wise attribute. With the element-wise attribute, the method is written as if it always takes and returns scalar objects. If the method is passed object arrays, the language processor notes the element-wise attribute assigned to the method and performs an element-wise operation on the array object. The separate results from the performance of the element-wise operation are concatenated into a single array result. The element-wise attribute can be used when the method follows the following rules:
- all input values belonging to the class defining the method are either scalar or arrays of the same size;
- all results that belong to the class defining the method are arrays of the same size as the input arrays; and
- each element in all such resulting arrays is simply the element-wise operation applied to the corresponding elements in the input arrays.

Those skilled in the art will recognize that alternate rules may be applied to the use of the element-wise attribute without departing from the scope of the present invention.

An exemplary Rectangle class to which the element-wise attribute is applied is set forth below.

```
classdef Rectangle
    properties
        X=0, Y=0, Width=0, Height=0
    end
    methods(ElementWise=true)
        function .expand(r, expansion)
        %    expand expands the rectangle in all directions
        %    The input rectangle r is modified such that the
        %    rectangle gets larger in all directions by expansion.
            r.X = r.X - expansion;
            r.Y = r.Y - expansion;
            r.Width = r.Width + expansion * 2;
            r.Height = r.Height + expansion * 2;
        end
    end
    methods(ElementWise=true)
        function r3 = plus(r1, r2)
            if (r1.X < r2.X)
                r3.X = r1.X;
                r3.Width = max(r1.Width, r2.X + r2.Width - r1.X);
            else
                r3.X = r2.X;
                r3.Width = max(r2.Width, r1.X + r1.Width - r2.X);
            end
            if (r1.Y < r2.Y)
                r3.Y = r1.Y;
                r3.Height = max(r1.Height, r2.Y + r2.Height - r1.Y);
            else
                r3.Y = r2.Y;
                r3.Height = max(r2.Height, r1.Y + r1.Height - r2.Y);
            end
        end
    end
end
```

Once the class is defined, rectangle array objects based on the class may be instantiated and operations may be performed on the objects such as:

```
R1(1,1) = Rectangle;
R1(2,1) = Rectangle;
R1(1,2) = Rectangle;
R1(2,2) = Rectangle;
R1(1,1).Width = 10;
R1(2,1).Width = 20;
R1(1,2).Width = 30;
R1(2,2).Width = 40;
R2 = Rectangle;
R2.X = 10;
R2.Y = 10;
R2.Width = 50;
R2.Height = 50;
R1.expand(10);
R3 = R1 + R2;
```

Figure 5:
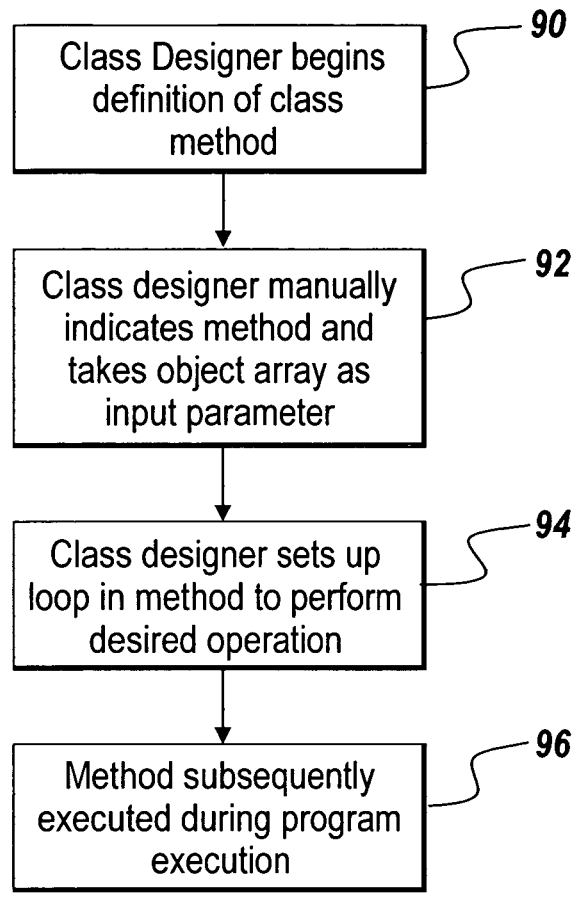
FIG. 5 (prior art) is a flowchart of a sequence of steps conventionally followed to perform element-wise operations.
Figure 6:
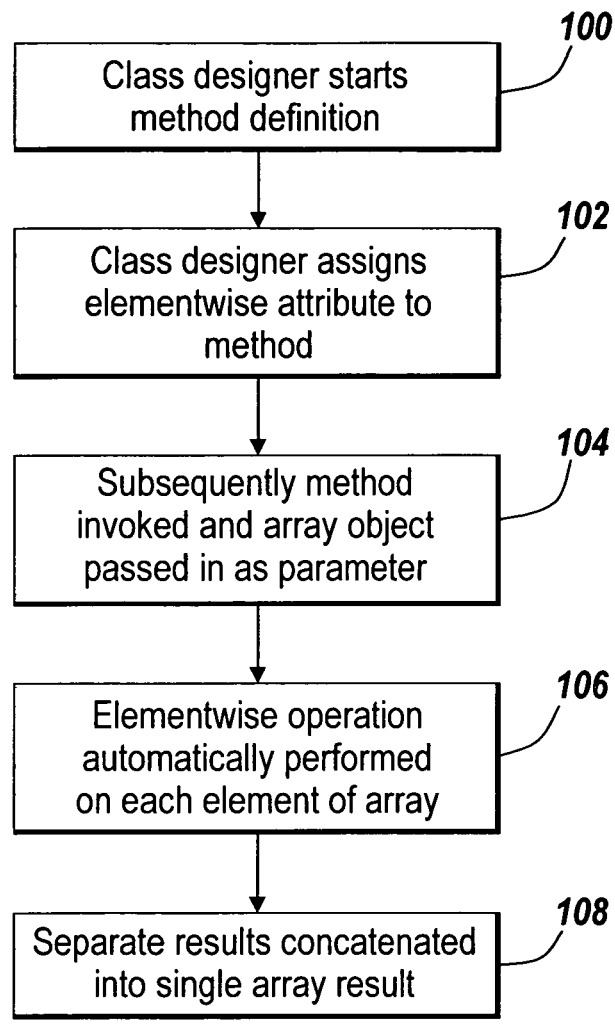
FIG. 6 is a flowchart of a sequence of steps followed by the illustrative embodiment of the present invention to declare and use a method with an element-wise attribute.

FIGS. 5 and 6 represent the sequence of steps followed by class designers conventionally and when utilizing the present invention to define methods with element-wise operations. FIG. 5 sets out a typical conventional procedure for defining methods that perform element-wise operations. Conventionally, the class designer would begin the definition of the class method (step 90) and then manually indicate that the method should take an object array as an input parameter (step 92). The class designer would then set up in the method definition an iterative loop that would be used to perform the element-wise operation (step 94). The method was then available to be called during a subsequent program execution (step 96).

In one aspect of the invention, arrays of classes may be used. For example, a model of the application windows on the graphical interface of a computing device may consist of an array of rectangles that indicate the window outlines. This could be modeled using a parameterized constructor that returns an array. In one example, the command 'screen=Rectangle(5)' may be issued to instantiate a variable 'screen' with 5 elements of type Rectangle.

In another aspect, set, list, and array constructors such as set comprehension may be applied. For example, classdef=numbers(1:10 & 1:2:10 & 1:3:10)

results in a class 'numbers' that is represented by a set with the elements 1 and 7, which is the intersection of the sets {1, 2, 3, 4, 5, 6, 7, 8, 9, 10}, {1, 3, 5, 7, 9} and {1, 4, 7, 10}. Note that the sets used in the intersection can be constructed based on comprehensions, in which case a prefix notation can be employed to indicate the set operations such as intersection and union.

FIG. 6 depicts the sequence of steps followed by the illustrative embodiment of the present invention to declare and use a method with an element-wise attribute. The sequence begins when the class designer begins the definition of a method for a class that is being defined (step 100). The class designer assigns the element-wise attribute to the method (step 102). Those skilled in the art will appreciate that this assignment of the attribute may be done by the use of keyword that is recognizable by the language processor. A programmer may subsequently invoke the method in a program and pass the method an object array as an input parameter (step 104). Because of the use of the element-wise attribute in the method definition, the method is set to receive an object array as an input parameter. The input object array automatically has an element-wise operation performed on it by the method (step 106). Those skilled in the art will recognize that the type of operation will depend on the method definition. The separate results of the element-wise operations are then concatenated into a single array result (step 108).

Meta-Data

In existing programming languages, such as C++, a compiler takes a program (commonly referred to as source code) and produces executable code that can be read and executed by a computer. The C++ code may use C++ syntax to create various objects and invoke methods on those objects. Where standard C++ syntax is used, the compiler must know the memory layout of every object created and the memory layout of every object used in a method invocation. It is possible for a C++ program to communicate with an external object, defined perhaps in JAVA or as a Microsoft COM control, but that communication is made possible through a special application programming interface (API) such as the JAVA Native Interface where JAVA methods are not invoked using the standard C++ syntax. Moreover, some existing languages require the use of a virtual machine, such as JAVA or any language operating in the Microsoft.NET framework or Common Language Runtime (CLR). These native languages, such as JAVA or C# programming language, that require the use of a virtual machine, such as the JAVA Virtual Machine (JVM) or CLR, can only operate on objects defined according to the requirements of the corresponding virtual machine. For example, all JAVA objects must be managed by the JAVA Garbage Collector while all the CLR objects must be managed by the CLR garbage collector. Hence, for these native languages, communication with external objects that are created under different virtual machines or frameworks must be made through special APIs outside the standard native language syntax.

Figure 7A:
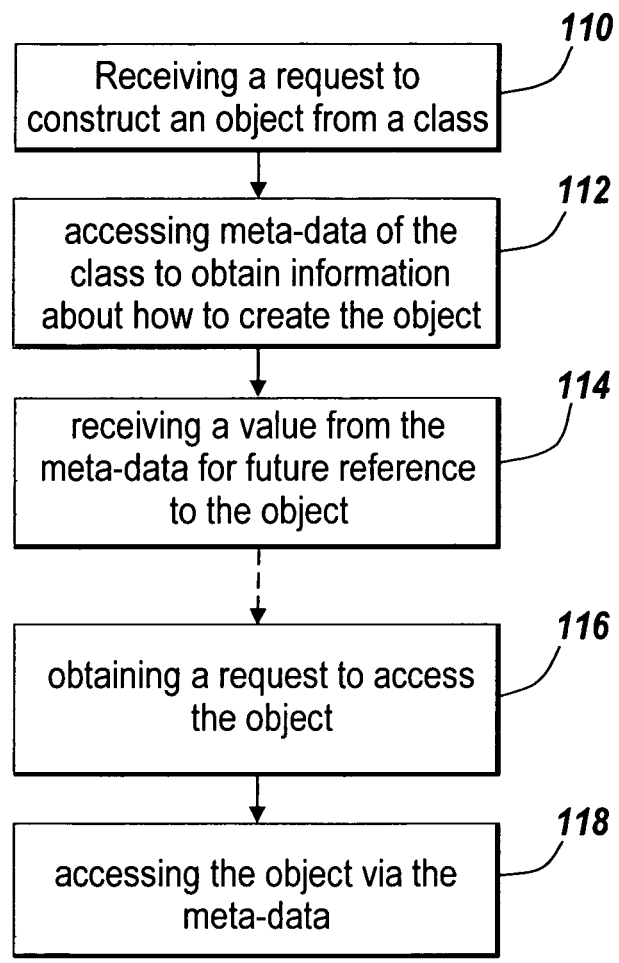
FIG. 7A illustrates a flowchart depicting steps taken to for a language processor to construct and access an object in accordance with one embodiment of the present invention.

The illustrative embodiment of the present invention includes a language processor 6 and a native language that operates in the language processor 6 where the syntax for defining and interacting with objects implies no assumption about how object data is stored in the computer (or even if the data is stored in the computer running the program). Instead, this native language is defined such that creation of objects and all access to objects is controlled by meta-data associated with the class of an object. FIG. 7A illustrates a flowchart depicting steps taken for a language processor to construct and access an object in accordance with one embodiment of the present invention. When the language syntax instructs the language processor 6 to construct an object from a given class (step 110), the meta-data object for the given class is consulted to construct the object (step 112). The class meta-data object may allocate storage for the object in any way, such as, on a heap, in a garbage collection system, by creating and/or opening a file and referencing a location within that file, or by allocating space on another computer, or by any combination of the above. The meta-data return a value that can be used to identify the object in subsequent access operations (step 114). Any subsequent call to methods or access to object data are also made through the meta-data and using the value returned by the meta-data after constructing the object (steps 116 and 118). This value may be a memory pointer, file pointer, object reference, system resource handle, or any other type of handle, pointer, or reference that identifies the constructed object. This value may also be a reference, handle, or pointer to an object that contains other references, handle, or pointers each of which is used to access a different part of the object as there is no requirement that the object be represented in contiguous memory or contiguous parts of a file, or within a single computing device. Different parts of the object may be stored in any variety of different ways.

Figure 7B:
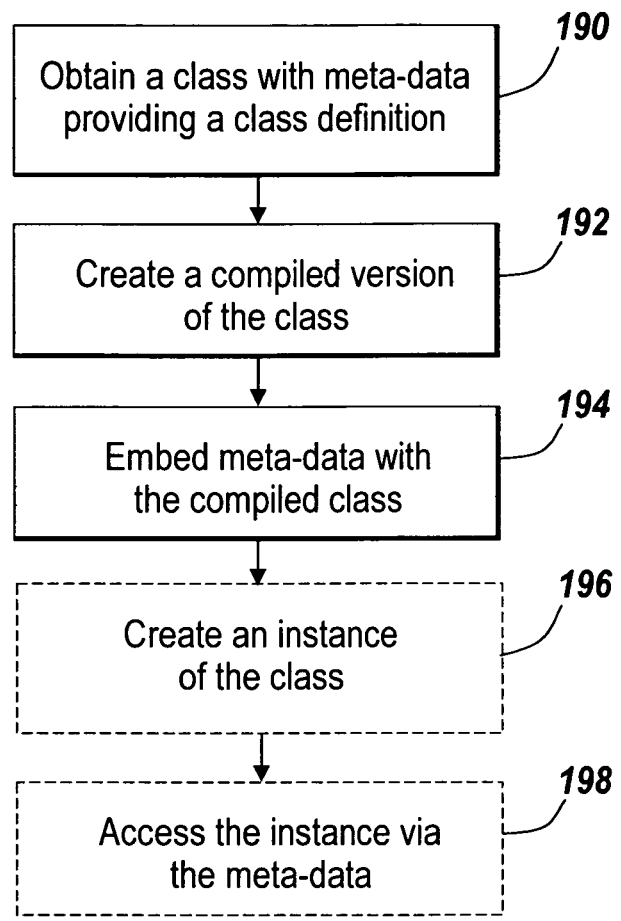
FIG. 7B illustrates a flowchart depicting steps taken to associate meta-data with a class in accordance with one embodiment of the present invention.

FIG. 7B illustrates a flowchart depicting steps taken to associate meta-data with a class in accordance with one embodiment of the present invention. A class that uses meta-data to provide a class definition is obtained in step 190. The class is then compiled in step 192. The meta-data is embedded in the compiled class in step 194. Now when an instance of the class is created in step 196, the instance can be accessed via the meta-data in step 198.

Figure 7C:
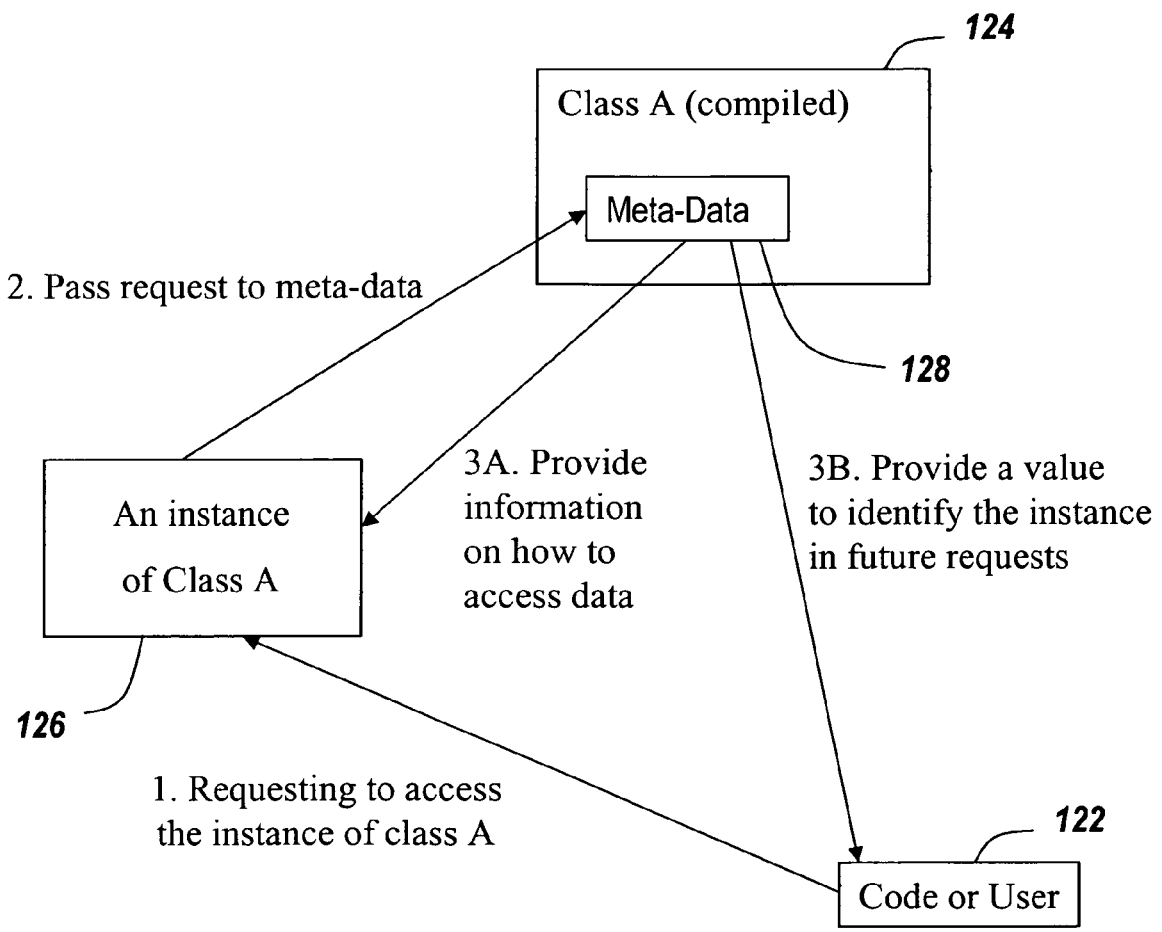
FIG. 7C illustrates how meta-data is used to access data in accordance with one embodiment of the present invention.

FIG. 7C illustrates how meta-data is used in accordance with one embodiment of the present invention. For each compiled class, the associated meta-data is embedded or stored with the compiled code. When a user or a code 122 requests to access data of an instance of class A 126, the request is passed to the meta-data 128 that is associated with the compiled class A 124. The meta-data 128 then provides information on how to access the data in the instance 126 and also provides the user or code 122 a value that can be used to identify the instance 126 in future requests.

A program executed by the language processor 6 may interact with native classes that are written in a language supported by the language processor 6. The language processor 6 may also interact with non-native classes written in a language that the language processor 6 does not know how to interpret or compile via meta-data (described below).

Figure 8:
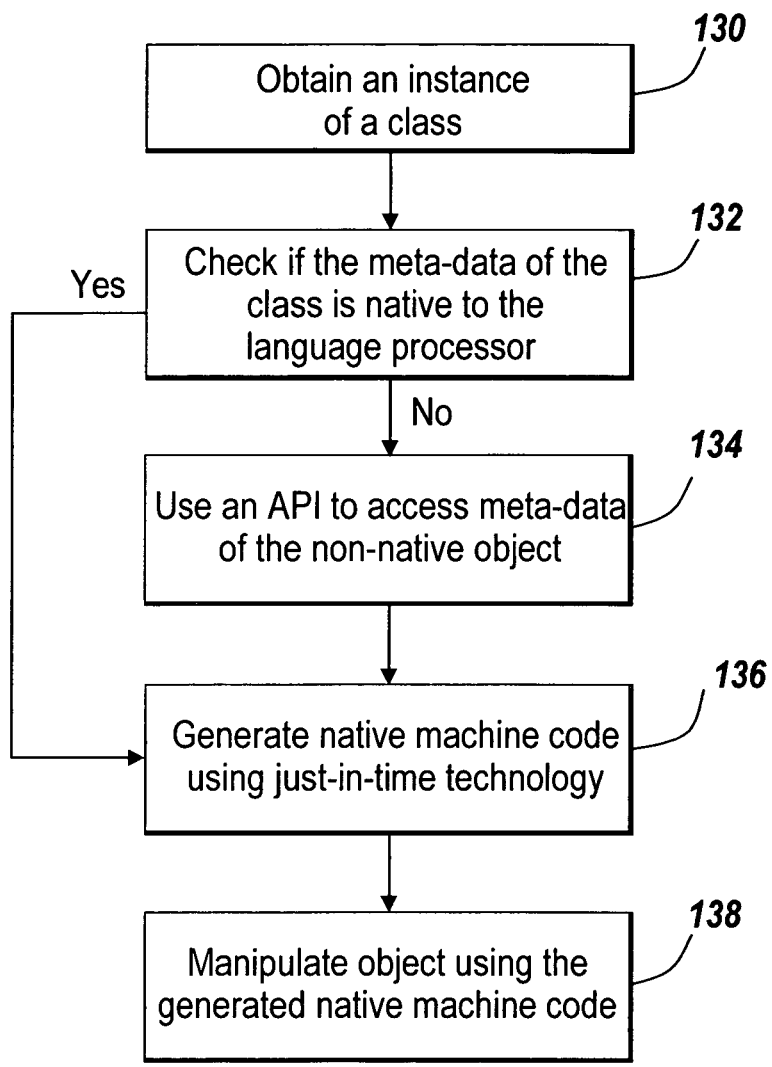
FIG. 8 illustrates a flowchart depicting steps taken to reduce the run-time overhead during execution in accordance to one embodiment of the present invention.

Using meta-data to construct and access objects may add run-time overhead during execution. This potential overhead can be reduced or eliminated when the language processor 6 acts on objects defined in the native language. A native language is a language that the language processor knows how to interpret or compile. FIG. 8 illustrates a flowchart depicting steps taken to reduce the run-time overhead during execution in accordance to one embodiment of the present invention. When the language processor 6 obtains an instance of a class to access (step 130), the language processor 6 can check if the meta-data associated with the class is native (step 132). The language processor 6 can recognize native meta-data through any number of means. For example, if the language processor is written in C++, it can ask if the meta-data is an instance of a native meta-class implemented using the native language, where the native meta-class is used to describe native classes. Alternatively, an API can be used to query the meta-data and return true if the meta-data defines a native class and false otherwise. When the language processor 6 recognizes meta-data for a native class, the language processor 6 can use an optional API defined for the native meta-data to find out how object data is stored and manipulated. The same or a different API may be used to access meta-data for a non-native class (step 134). It may not be possible to implement this API for all non-native classes, but where it is possible, such an API can allow the language processor to access non-native objects at the same speed as it can access native objects. The language processor 6 can then use just-in-time compiler technology to generate native machine code that directly manipulates a native or non-native object (steps 136 and 138) based on the information provided by the optional meta-data API.

In embodiments of the present invention, data associated with a non-native class instance may also be accessed by using non-native meta-data implementing an API that provides information about how the non-native objects are stored and accessed. The information provided by the API can then be used by the just-in-time compiler of the language processor 6 to produce native machine code that directly manipulates the non-native object. In other words, the present invention provides a language processing system that defines a meta-data API that allows meta-data to specify how to access objects in an external (non-native) class system at compile time. There are existing APIs in the prior art that allow one system to access class instances in another system, but these APIs add a layer of execution that costs time. One advantage of the present invention is that overhead is reduced by eliminating APIs that mediate between two different class systems at run-time. The API in the present invention supplies information about the non-native class at compile (or just-in-time compile) time and the compiled code is then used for all interactions with non-native objects belonging to the same class. The compiled code may be in a machine language or a virtual machine language or a combination thereof. It is possible that some of the compiled code is in a machine or virtual machine language associated with the non-native object system.

The illustrative embodiments of the present invention allows for object creation and access syntax to be interpreted or compiled differently depending on the meta-data associated with the class of object being created or accessed. The illustrative embodiments allow the same syntax to be used to manipulate objects created from both native classes and non-native classes by using the meta-data to provide a level of indirection between the language processor and the objects.

Figure 9:
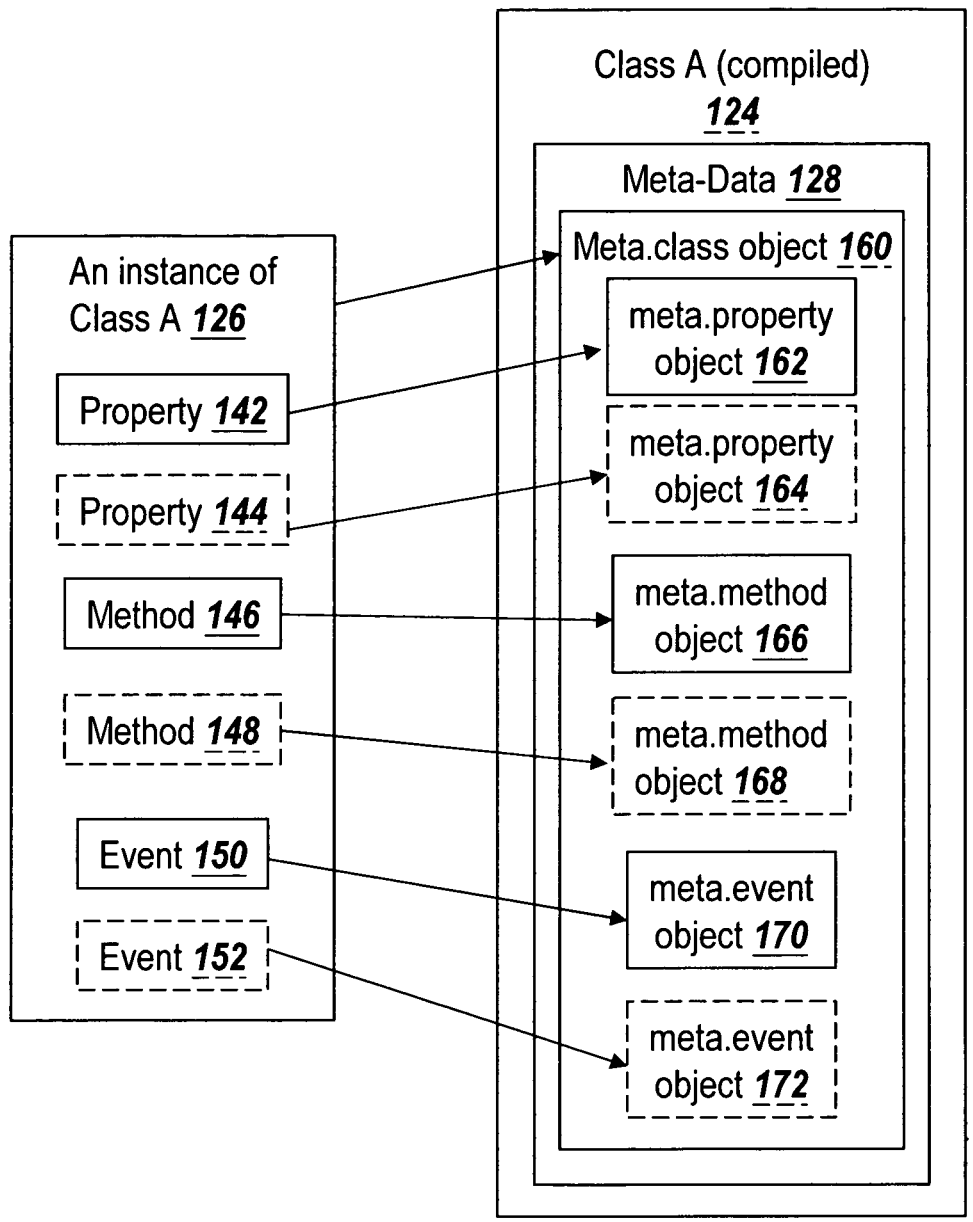
FIG. 9 illustrates how different components of a class are related different types of meta-data.

The illustrative embodiments implement different type of meta-data using different meta-classes: meta.class, meta.property, meta.method, and meta.event. Meta-data are used to describe the meanings/aspects of class data and behaviors, such as ones that are implemented in JAVA, C++/C#, or MATLAB®. One of ordinary skill in the art will appreciate that there are many different meta-classes that can be used and the specific meta-classes used are implementation dependent. FIG. 9 illustrates how different components of a class are related to different types of meta-data. Meta-data 128 of a compiled class A 124 provides class description and access information of an instance of class A 126. FIG. 9 shows that the instance of class A 126 includes a property 142, an optional property 144, a method 146, an optional method 148, an event 150, and an optional event 152. FIG. 9 further shows that meta-data 128 includes a meta.class object 160 that contains a meta.property object 162, an optional meta.property object 164, a meta.method object 166, an optional meta.method object 168, an meta.event object 170, and an optional event 172. Each property, method, or event in the instance of class A 126 corresponds to a meta-object in the meta-data 128 of a compiled class A 124. Each different property, method, or event corresponds to a different meta-object. When the native language processor requests access to data or information describing a property, method or event from the instance of class A 126, the corresponding meta-object in the meta-data 128 in the compiled class A 124 is consulted. The corresponding meta-object then performs the request, such as obtaining a description, reading a data value, or writing a data value, and returns the results of the request.

A language such as MATLAB® can have syntax for defining classes. In the present invention, this syntax has a direct correspondence with meta-data classes. When defining classes and their constituent parts such as methods, it is common for language syntax to provide a means to specify various attributes of the class or its constituent parts such as methods. For example, in the JAVA programming language, the public keyword can be used to specify that a class or method can be accessed from methods belonging to outside code in unrelated classes. The JAVA.lang.Class meta-class has a getModifiers( ) method returning an int. This int can be decoded to determine if the class is public. In the present invention, information equivalent to JAVA modifiers (here referred to more generally as attributes), is encoded in the class definition syntax so that attributes can be specified along with their values. Every attribute in the class definition syntax corresponds to a property in a meta-data class. In a preferred embodiment of the invention for the MATLAB® language, attributes are specified using a parenthetical list of statements where each statement assigns an attribute to a value. An important aspect of embodiments of the present invention is that attributes are specified in such a way as to avoid using keywords like the public modifier in JAVA. Instead, attribute names are interpreted relative to a meta-data class. In a preferred embodiment, the meta-data class is either explicitly stated in the parenthetical list before the first attribute statement or else the meta-data class is inferred to be the default meta-data class given the context of the parenthetical list.

For example, the following is a class definition using a preferred embodiment of the present invention:

```
classdef MyClass(Sealed = true; DynamicProperties = false)
    properties(Dependent = true, SetAccess = 'private')
        Foo
    end
    methods(Static = true)
        function obj = createMyClassSingleton
        ...
        end
    end
end
```

In this example, the meta-data class associated with a classdef keyword is assumed to be the default meta-class. The meta-data class associated with the properties keyword is assumed to be the default meta-property class. These meta-classes could be specified explicitly as in:

```
classdef MyClass(meta.class, . . .
                Sealed = true; . . .
                DynamicProperties = false)
    properties(meta.property, . . .
                Dependent = true, . . .
                SetAccess = 'private')
        Foo
    end
    methods(meta.method, Static = true)
        function obj = createMyClassSingleton
        ...
        end
    end
end
```

Here, the meta-classes are specified explicitly before the attribute statements. In a preferred embodiment, multiple properties, methods, or events may be grouped together with a single meta-class and attribute statement list. For example:

```
classdef MyClass
    properties (meta.property, . . .
                Dependent = true, . . .
                SetAccess = 'private')
        Foo
        Bar
    end
    . . .
end
```

Here, MyClass has two properties Foo and Bar that share the same meta-property class meta.property and attribute values for Dependent and SetAccess. There may still be two meta-property instances—one for Foo and one for Bar, but the class definition syntax provides shorthand for specifying the multiple class constituents that share the same attribute values.

In a preferred embodiment of the present invention, each attribute in the class definition syntax corresponds to a property of a meta-data class. The following is an exemplary description of the different meta-data classes designed for use in the MATLAB® programming language as the design environment.

meta.class

This meta-data class is used to describe a MATLAB® class. A meta.class meta-data class may contain information that describe different attributes of a class, such as whether or not the class is sealed where a sealed class can't have subclasses. meta.class can also include a list of meta-properties, meta-methods, and meta-events that describe corresponding properties, methods, and events that belong to the class. Each attribute in the class corresponds to a property of the meta.class that is settable (i.e. default value can be changed. The following are a few examples of such properties.

Properties

Sealed (default=false)

A logical value where true means this class may be not be specialized with sub-classes if sealed.

InferiorClasses (default { })

A cell array of meta.class objects. This attribute provides backward compatibility with the inferiorto function used in old-style class definitions. The built-in MATLAB® classes double, single, char, logical, int64, uint64, int32, uint32, int16, uint16, int8, uint8, cell, struct, and function_handle are always inferior to user-defined classes and do not show up in this list.

DynamicProperties (default=true)

A logical value where true means the class allows instances to have dynamic properties. A dynamic property is a property of a specific instance added at run-time. A dynamic property does not change the class of an object, but adds additional data or state information that may relate to the object's specific environment. For example if one object contains other objects like a layout manager contains widgets, then the container may store information in the dynamic properties of each contained object where those properties specify how the contained objects are organized within the container. This information does not belong in the widget classes because instances of those classes are not always controlled by a layout manager. This information also doesn't belong in the layout manager because it is specific to each controlled widget.

If X is a MATLAB® variable that contains a meta.class object, then its Sealed property is accessed using standard MATLAB® property access notation:

X. Sealed

There is a direct correspondence between this meta-class property and its corresponding attribute in the class definition.

```
classdef (Sealed = true)
    . . .
end
```

This method of defining classes in the present invention allows users to easily see how an attribute defined in the class definition is reflected in the meta-data class. By avoiding the use of keywords for attributes, new attributes can be added to meta-data classes without introducing backward incompatibility. For example, JAVA has an attribute similar in function to Sealed. This attribute is specified in the class definition using a keyword named "final." When a new keyword is added to a language like JAVA, the use of that word for any other purpose, such as naming a class, is forbidden. The class definition notation in the present invention does not require that each attribute name be a keyword because the meaning of the attribute name is interpreted based on its context. In the described embodiments, the context is defined by the keyword to the right of the parenthetical list of attribute statements. In a preferred embodiment of the present invention, keywords are only associated with each meta-class: classdef for meta.class, properties for meta.property, methods for meta.method, and events for meta.event.

A class definition may specify a specific meta-class (in this case, a subclass of meta.class) to be used with a class. For example, to define an interface class, one can use syntax like the following:

```
classdef (meta.interface, Sealed = true)
    . . .
end
```

Here, the name of the meta-class subclass is specified before the attribute statements in the parenthetical list. One of ordinary skill in the art will appreciate that the present invention is not limited to the specific syntax used herein and other different syntaxes can also be used to specify a specific meta-class to use.

The meta.class meta-class can also have methods that describe, for example, the different set operations that can be used on classes in accordance with one embodiment of the present invention.

Methods

*tf=eq(cls)*

The equality function "=" can be used to test if two variables refer to equal classes (classes that contain exactly the same lists of elements).

*tf=ne(cls)*

The negative equality function "~=" can be used to test if two variables refer to different meta-classes.

*tf=lt(clsA,clsB)*

The less-than function "<" can be used in "clsA<clsB" to test if clsA is a strict subclass of clsB.

*tf=le(clsA,clsB)*

The less-than-or-equal-to function "<=" can be used in "clsA<=clsB" to test if clsA is a subclass of clsB.

*tf=gt(clsA,clsB)*

The greater-than function ">" can be used in "clsB>clsA" to test if clsB is a strict super-class of clsA.

*tf=ge(clsA,clsB)*

The greater-than function ">=" can be used in "clsB>=clsA" to test if clsB is a super-class of clsA.

*clsC=and(clsA,clsB)*

The and function "&" produces an intersection class. "clsA & clsB" yields the class that is the intersection of classes clsA and clsB. For a value to belong to this intersection class, it must be a member of clsA and a member of clsB. Note that intersection is not the same as the greatest common base class which is a larger class than either clsA or clsB. The intersection class contains those members of clsA that are also members of clsB.

*clsC=or(clsA,clsB)*

The or function "|" produces a union class. "clsA V clsB" yields the class that is the union of classes clsA and clsB. For a value to belong to this union class, it must be a member of either clsA or clsB or both clsA and clsB.

*clsC=xor(clsA,clsB)*

The xor function "V" produces a union class. "clsA V clsB" yields the class that is the exclusive union of classes clsA and clsB. For a value to belong to this exclusive union class, it must be a member of either clsA or clsB but not both clsA and clsB.

Additional methods or static methods can also be included in a meta.class meta-class. The following is an exemplary method that checks if an implementation of a class conforms to the definition given by a corresponding meta-class.

validate(cls)
The validate method is passed the class meta-data object with any child meta-data objects for properties, methods, and events, and may issue an error if the class is not valid. The validate method is called by MATLAB® when a class definition is needed (either to construct an instance or to return the meta-data object).

A meta.class meta-class can include meta-data events that describe how an event handles the creation or destruction of an instance. The following are two exemplary events that can be included in a meta.class meta-class.

Events
InstanceCreated
If this class is a handle class, this event occurs every time a new instance of this handle class, including new instances of any subclasses, is created. The event occurs immediately after all constructor functions have finished executing.
InstanceDestroyed
If this class is a handle class, this event occurs every time an instance of this handle class (including all subclasses) is destroyed. The event occurs immediately before any destructor functions execute.

In one aspect of the present invention, a meta.interface meta-class can be implemented as a subclass of the meta.class meta-class to describe an abstract class. A user can also create a user-defined class that is a sub-class of the meta.class so that a user-defined meta-class can be implemented (discussed later).
meta.interface<meta.class This class is used to describe a purely abstract class. An interface defines no properties or events. It can subclass other interfaces and it can declare abstract methods. If a class definition uses the meta.interface meta-class, then an error will be issued, by the meta.interface implementation of the validate method, if the class definition does not conform to the definition of an interface class.

meta.property
This meta-data class provides the meta-data for each property or state variable in a class. A user can create a user-defined class that is a sub-class of the meta.property meta-data class to describe a user-defined property or state variable. An instance of a meta.property meta-data class (or an instance of a subclass of meta.property) is created for each property or state variable in a class. Each meta.property instance created is a meta-data object that is contained in an instance of a meta.class (or an instance of a subclass of meta.class). The following are exemplary properties and events that a meta.property meta-data class can have.

Properties
GetAccess (default='public')
Determines under what circumstances the value of this property may be acquired. If 'public', any code may obtain a value for this property. If 'protected', only methods belonging to the class (including subclasses) defining this property may acquire its value. If 'private', only methods in the same class definition as this property may acquire its value. Subclasses are not included in private access.
SetAccess (default='public')
Determines under what circumstances the value of this property may be modified. If 'public', any code may modify the value of this property. If 'protected', only methods belonging to the class (including subclasses) defining this property may modify its value. If 'private', only methods in the same class definition as this property may modify its value. Subclasses are not included in private access.
Sealed (default=true)
A sealed property (Sealed=true) means that this property may not be redefined by subclasses. It is an error to define a property with the same name as a sealed property defined in any superclass. If the property is not sealed, then subclasses may redefine the property. An unsealed property is not common to all members of the class. Individual subclasses may define the property differently, including by giving the property protected or private set and get access which would essentially remove the property from the public interface of the subclass.
Dependent (default=false)
If a property is not dependent, instances of the class allocate storage to hold a value for this property. If a property is dependent, then the object has no storage for the property value and neither set nor get methods may access the property by indexing into the object using the property name.
Static (default=false)
A static property is a property of the class which has the same value for all instances of the class. The property value is static as it does not change from instance to instance.
Abstract (default=false)
If true, this property has no implementation. A concrete subclass must redefine this property without the Abstract attribute being set. Abstract implies that Sealed=false and setting the Sealed attribute explicitly is not required. Setting both Abstract and Sealed to true produces an error.

Transient (default=false)

The value of a transient property is never stored when an object is saved in a file.

Events

PreGet

This event occurs every time this property is about to be queried.

PostGet

This event occurs just after this property has been queried.

PreSet

This event occurs every time this property is about to be modified.

PostSet

This event occurs just after this property has been modified.

meta.method

This meta-data class provides meta-data for describing a method in a class. A user can create a subclass from the meta.method meta-data class to create a customized method for a class. An instance of meta.method (or a subclass of meta.method) is created for each method in a class. Every instance is a meta-data object that is contained in an instance of a meta.class (or a subclass of meta.class). The following is a list of possible properties that a meta.method meta-data class can have.

Properties

Access (default='public')

This attribute controls what code has permission to call this method. If Access is 'public' then any code may call this method. If Access is 'protected', then only code inside methods belonging to the class and its subclasses will have access to this method. If Access is 'private', then only code in methods of this particular class will be able to call this method.

Static (default=false)

If true, the method is static—not dependent on a particular object and the method is called using the class as a prefix. If false, the method must be passed a parameter that is an instance of the class defining this method.

ElementWise (default=false)

If true, the method implementation is vectorized by MATLAB® by calling the method elementwise for each element in all input object arrays. If this attribute is true, then MATLAB® will insert the user-defined method inside of a loop inside of built-in code that:

finds all arguments belonging to the class of the method;

checks that all such arguments either have the same size or are scalar;

loops over the elements in canonical MATLAB® order;

and executes the user-defined method implementation once for each element position with each non-scalar object argument replaced by a scalar object acquired by referencing the current element number in the original object argument.

If false, the method will be executed as defined and will need to handle object arrays.

Abstract (default=false)

If true, this method has no implementation. The method has a normal function line that may include input and output argument lists that subclasses are expected to follow when implementing this method. However, subclasses are not required to support the same number of input and output arguments. The method may also have documentation comments following the function line. An abstract method must not be terminated by end.

External (default=false)

External methods are defined in separate files outside the class definition. An external method should have a function line with input and output arguments matching the external definition. An external method must not be terminated by end. The help comments will be taken from the external file so while comments are permitted they will not be used by help.

Sealed (default=false)

A sealed method may not be overridden by a subclass. If a subclass defines a method with the same name as a sealed method, that will produce an error.

Visible (default=true)

A visible method shows in the list of methods using the methods command or methodsview viewer. A method with Visible set to false will not be included in these listings.

meta.event

This meta-data class provides meta-data for describing an event in a class. A user can create a subclass from the meta.event meta-data class to create a customized event for a class. An instance of meta.event meta-data class (or an instance of a subclass of meta.event) is created for each event in a class. Every instance is a meta-data object that is contained in an instance of a meta.class meta-data class (or an instance of a subclass of meta.class). The following is a list of possible properties that a meta.event meta-data class can have.

Properties

Sealed (default=true)

A sealed event may not be overridden by a subclass. If a subclass defines an event with the same name as a sealed event, that will produce an error.

ListenAccess (default='public')

This attribute controls what code has permission to create listeners for this event. If Access is 'public' then any code may listen to this event. If Access is 'protected', then only code inside methods belonging to the class and its subclasses will be allowed to create listeners for this event. If Access is 'private', then only code in methods of this particular class will be able to create listeners for this event.

NotifyAccess (default='public')

This attribute controls what code has permission to create listeners for this event. If Access is 'public' then any code may listen to this event. If Access is 'protected', then only code inside methods belonging to the class and its subclasses will be allowed to create listeners for this event. If Access is 'private', then only code in methods of this particular class will be able to create listeners for this event.

In a preferred embodiment of the present invention, meta-data are used to describe a class definition and access class data. Meta-data allow introspection in a dynamically-typed array-based programming language.

Figure 10:
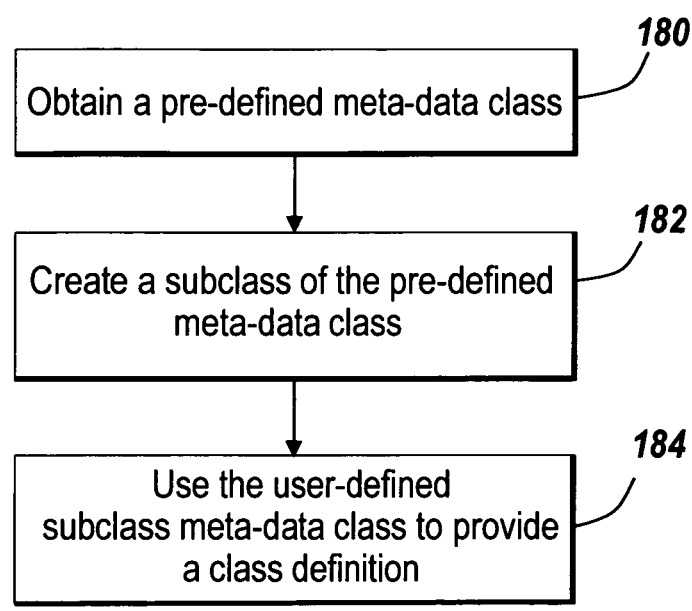
FIG. 10 illustrates a flowchart depicting steps taken to extend a class definition by subclassing.

In one embodiment of the present invention, meta-data is used to allow extension of class definitions. In other words, one embodiment of the present invention provides a mechanism for a user to create customized meta-data to support customized classes. New attributes can be created, unlike many existing programming languages that do not allow such extension. To create a customized meta-class, meta-property, meta-method, or meta-event, one can create a subclass from meta.class, meta.property, meta.method, or meta.event. FIG. 10 illustrates a flowchart depicting steps taken to extend a class definition by subclassing. A pre-defined meta-data class is obtained in step 180. A user-defined subclass is created from the pre-defined meta-data class in step 182. Once the user-defined subclass is created, it can be used in a class definition for defining an aspect of a class in step 184. Every meta-data class property that that can be set publicly becomes an attribute that can be specified in the attribute statement list.

Subclassing can also be used as a convenience to change a default value for an attribute represented by a property in a meta-data class. For example, a PrivateProperty subclass can be created from meta.property as shown below.

```
classdef PrivateProperty < meta.property
    methods
        function p = PrivateProperty
            p.SetAccess = 'private';
            p.GetAccess = 'private';
        end
    end
end
```

A class can then use PrivateProperty meta-class as in the following example to create a customized property/state variable: a property/state variable with the attribute values defined by PrivateProperty.

```
classdef MyClass
    properties
        PropA
    end
    properties (PrivateProperty)
        PropB
    end
    properties (PrivateProperty, Static=true)
        PropC
    end
end
```

One of ordinary skill in the art will appreciate that a sub-class can be created not only from meta.property, but also from other meta-data classes.

As shown in the above example, the illustrative embodiments of the present invention provides a language processor that supports the use of a meta-data classes in a class definition. A meta-data class can be used to describe attributes of a class, a property/state variable, a method, or an event.

Some embodiments of the present invention may be provided as one or more computer-readable programs embodied on or in one or more mediums. The mediums may be a floppy disk, a hard disk, a compact disc, a digital versatile disc, a flash memory card, a PROM, a RAM, a ROM, an MRAM, or a magnetic tape. In general, the computer-readable programs may be implemented in any programming language. Some examples of languages that can be used include MATLAB®, FORTRAN, C, C++, C#, JAVA, PYTHON, and UML. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A method comprising:
defining a meta-data class having meta-data used to describe a class and constituent components of the class, the meta-data class having a property, and
the defining being performed by a computing device;
creating a compiled version of the class,
the compiled version of the class being embedded with the meta-data, and
the creating being performed by the computing device;
creating an instance of the class,
the creating the instance of the class being performed by the computing device;
receiving, from an entity, a request to access the instance of the class,
the receiving performed by the computing device;
accessing, the property of the meta-data class embedded in the compiled version of the class to determine how to access data associated with the instance of the class,
the accessing being performed by the computing device;
receiving, based on accessing the property of the meta-data class, information regarding how to access the data associated with the instance of the class,
the meta-data providing the information,
the meta-data providing a value to the entity,
the value being used to identify the instance of the class, and
the receiving the information regarding how to access the data associated with the
instance of the class being performed by the computing device; and
accessing, based on the information regarding how to access the data associated with the instance of the class, the data associated with the instance of the class,
the accessing the data associated with the instance of the class being performed by the computing device.

2. The method of claim 1, where
the class is associated with a programming language, and
the programming language is a dynamically typed array-based programming language.

3. The method of claim 1, where
the class is defined by a class definition that includes a specification of constituent properties, and
each specified constituent property, of the constituent properties, corresponds to an instance of a first meta-property class.

4. The method of claim 3, where
the specification of the constituent properties includes a specification of an attribute and a value associated with the attribute, and
the attribute is represented by a property of a second meta-property class.

5. The method of claim 3, where the constituent property specification includes a specification of a particular meta-property class.

6. The method of claim 1, where
the class is defined by a class definition that includes a specification of constituent methods, and
each specified constituent method, of the constituent methods, corresponds to an instance of a meta-method class.

7. The method of claim 6, where
the specification of the constituent methods includes a specification of an attribute and a value of the attribute, and
the attribute is represented by a property of the meta-method class.

8. The method of claim 6, where the specification of the constituent methods includes a specification of a particular meta-method class.

9. A system comprising:
a processor to:

define a meta-data class having meta-data used to describe a class and constituent components of the class,
the meta-data class having a property;
create a compiled version of the class,
the compiled version of the class being embedded with the meta-data class;
create an instance of the class;
receive, from an entity, a request to access the instance of the class;
access, based on receiving the request, the property of the meta-data class embedded in the compiled version of the class to determine how to access data associated with the instance of the class;
receive, based on accessing the property of the meta-data class, information regarding how to access the data associated with the instance of the class,
the meta-data providing the information,
the meta-data providing a value to the entity, and
the value being used to identify the instance of the class; and
access, based on the information regarding how to access the data associated with the instance of the class, the data associated with the instance of the class.

10. The system of claim 9, where
the class is associated with a programming language, and
the programming language is a dynamically typed array-based programming language.

11. The system of claim 9, wherein where class is defined using meta-data.

12. A non-transitory computer-readable storage medium storing instructions, the instructions comprising:
one or more instructions which, when executed by a processor, cause the processor to:
associate a meta-class with a class,
the meta-class having meta-data including a property,
create a compiled version of the class,
the compiled version being embedded with the property of the meta-class;
create an instance of the class;
receive, from an entity, a request to access the instance of the class;
access, based on receiving the request, the property of the meta-class embedded in the compiled version of the class to determine how to access data associated with the instance of the class;
receive, based on accessing the property of the meta-data class, information regarding how to access the data associated with the instance of the class,
the meta-data providing the information,
the meta-data providing a value to the entity, and
the value being used to identify the instance of the class; and
access, based on the information regarding how to access the data associated with the instance of the class, the data associated with the instance of the class.

13. The storage medium of claim 12, where
the class is associated with a programming language, and
the programming language is a dynamically typed array-based programming language.

14. A computer-readable storage medium storing instructions, the instructions comprising:
one or more instructions which, when executed by a processor, cause the processor to:

define a meta-data class having meta-data used to describe a class and constituent components of the class,
the meta-data class having a property;
create a compiled version of the class,
the compiled version of the class being embedded with the meta-data class property;
create an instance of the class;
receive, from an entity, a request to access the instance of the class;
access, based on receiving the request, the property of the meta-data class embedded in the compiled version of the class to determine how to access data associated with the instance of the class;
receive, based on accessing the property of the meta-data class, information regarding how to access the data associated with the instance of the class,
the meta-data providing the information,
the meta-data providing a value to the entity, and
the value being used to identify the instance of the class; and
access, based on the information regarding how to access the data associated with the instance of the class, the data associated with the instance of the class.

15. The storage medium of claim 14, where
the class is associated with a programming language, and
the programming language is a dynamically typed array-based programming language.

16. The method of claim 1, where
accessing the property of the meta-data class occurs in a distributed computing environment that includes a first computing device and a second computing device,
one of the first computing device or the second computing device executes a language processor for processing programs written in a dynamically typed array-based language in which values are represented by arrays, and
the dynamically typed array-based language supports array indexing.

17. The medium of claim 14, where storage for the instance is allocated, using the meta-data, when the instance is created.

18. The method of claim 1, where storage for the instance is allocated, using the meta-data, when the instance is created.

19. The system of claim 9, where storage for the instance is allocated, using the meta-data, when the instance is created.

20. The system of claim 9, where
the class is defined by a class definition that includes a specification of constituent properties,
each specified constituent property corresponds to an instance of a first meta-property class,
the specification of the constituent properties includes a specification of an attribute and a value associated with the attribute,
the attribute is represented by a property of a second meta-property class, and
the constituent property specification includes a specification of a particular meta-property class.

21. The system of claim 9, where
the class is defined by a class definition that includes a specification of constituent methods,
each specified constituent method, of the constituent methods, corresponds to an instance of a meta-method class,
the specification of the constituent methods includes a specification of an attribute and a value of the attribute,
the attribute is represented by a property of the meta-method class, and the specification of the constituent methods includes a specification of a particular meta-method class.

22. The storage medium of claim 12, where storage for the instance is allocated, using the meta-data, when the instance is created.

23. The storage medium of claim 12, where
the class is defined by a class definition that includes a specification of constituent properties,
each specified constituent property corresponds to an instance of a first meta-property class,
the specification of the constituent properties includes a specification of an attribute and a value associated with the attribute,
the attribute is represented by a property of a second meta-property class, and
the constituent property specification includes a specification of a particular meta-property class.

24. The storage medium of claim 12, where
the class is defined by a class definition that includes a specification of constituent methods,
each specified constituent method, of the constituent methods, corresponds to an instance of a meta-method class,
the specification of the constituent methods includes a specification of an attribute and a value of the attribute,
the attribute is represented by a property of the meta-method class, and
the specification of the constituent methods includes a specification of a particular meta-method class.

25. The storage medium of claim 14, where
the class is defined by a class definition that includes a specification of constituent properties,
each specified constituent property corresponds to an instance of a first meta-property class,
the specification of the constituent properties includes a specification of an attribute and a value associated with the attribute,
the attribute is represented by a property of a second meta-property class, and
the constituent property specification includes a specification of a particular meta-property class.

26. The storage medium of claim 14, where
the class is defined by a class definition that includes a specification of constituent methods,
each specified constituent method, of the constituent methods, corresponds to an instance of a meta-method class,
the specification of the constituent methods includes a specification of an attribute and a value of the attribute,
the attribute is represented by a property of the meta-method class, and
the specification of the constituent methods includes a specification of a particular meta-method class.

* * * * *